United States Patent
Alù et al.

(10) Patent No.: US 12,306,370 B2
(45) Date of Patent: May 20, 2025

(54) THERMAL METASURFACE COMBINING LOCAL AND NON- LOCAL LIGHT-MATTER INTERACTIONS

(71) Applicant: Research Foundation of the City University of New York, New York, NY (US)

(72) Inventors: Andrea Alù, Tenafly, NJ (US); Adam C. Overvig, Bronx, NY (US); Sander A. Mann, Brooklyn, NY (US); Ryan Nolen, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 556 days.

(21) Appl. No.: 17/751,078

(22) Filed: May 23, 2022

(65) Prior Publication Data

US 2022/0381950 A1  Dec. 1, 2022

Related U.S. Application Data

(60) Provisional application No. 63/192,292, filed on May 24, 2021.

(51) Int. Cl.
*G02B 1/00* (2006.01)
*G02B 5/30* (2006.01)

(52) U.S. Cl.
CPC .......... *G02B 1/002* (2013.01); *G02B 5/3033* (2013.01)

(58) Field of Classification Search
CPC ........ G02B 1/002; G02B 5/3033; G02B 5/18; G02B 5/1809; G02B 5/1819; G02B 5/1823; G02B 5/1866; G02B 2005/1804; G02B 27/0944; G02B 27/42–4294; G02B 26/0808; G02B 2207/101; G02F 2202/30; B82Y 20/00
See application file for complete search history.

(56) References Cited

U.S. PATENT DOCUMENTS

| | | |
|---|---|---|
| 9,739,918 B2 | 8/2017 | Arbabi et al. |
| 11,366,296 B2 | 6/2022 | Devlin et al. |
| 2022/0236453 A1 | 7/2022 | Alù et al. |

OTHER PUBLICATIONS

Arbabi, A. et al.; Dielectric Metasurfaces for Complete Control of Phase and Polarization with Subwavelength Spatial Resolution and High Transmission; Nature Nanotechnology; Aug. 31, 2015; pp. 937-943; vol. 10.
Khorasaninejad, M. et al.; Super-Dispersive Off-Axis Meta-Lenses for Compact High Resolution Spectroscopy; Nano Lett; Apr. 27, 2016 pp. 3732-3737; vol. 16; DOI: 10.1021/acs.nanolett.6b01097.
Zhu, A. et al.; Ultra-compact visible chiral spectrometer with meta-lenses; APL Photonics 2; Feb. 7, 2017; pp. 036103-1-036103-12; https://doi.org/10.1063/1.4974259.
(Continued)

*Primary Examiner* — Stephone B Allen
*Assistant Examiner* — Adam W Booher
(74) *Attorney, Agent, or Firm* — Peter J. Mikesell; Schmeiser, Olsen & Watts, LLP

(57) ABSTRACT

A thermal metasurface that provides a planar optical source based on thermal radiation or photoluminescence. The thermal metasurface provides dual perturbative control of both radiative and non-radiative lifetimes of a q-BIC via geometric and material perturbation of monomeric and dimeric pillars.

17 Claims, 20 Drawing Sheets

(56) References Cited

OTHER PUBLICATIONS

Vaskin, A. et al.; Light-emitting metasurfaces; Nanophotonics; Jul. 2019; pp. 1151-1198; 8(7); https://doi.org/10.1515/nanoph-2019-0110.

Dahan,N. et el.; Geometric Doppler Effect: Spin-Split Dispersion of Thermal Radiation; Physical Review Letters; Sep. 21, 2010; pp. 136402-1-136402-4; DOI: 10.1103/PhysRevLett.105.136402.

Greffet, J. et al.; Coherent emission of light by thermal sources; letters to nature; Mar. 7, 2002; pp. 61-64; vol. 416.

Overvig, A. et al.; Multifunctional Nonlocal Metasurfaces; Physical Review Letters; Jul. 2, 2020; pp. 017402-1-017402-6; DOI: 10.1103/PhysRevLett.125.017402.

Lee, J. et al.; Circularly polarized thermal radiation from layer-by-layer photonic crystal structures; Appl. Phys. Lett.; Jan. 31, 2007; pp. 051912-1-051912-3; vol. 90; DOI: 10.1063/1.2435958.

Overvig, A. et al.; Selection rules for quasibound states in the continuum; Physical Review B; Jul. 24, 2020; pp. 035434-1-035434-28; DOI: 10.1103/PhysRevB.102.035434.

Wadsworth, S. et al.; Broadband circularly-polarized infrared emission from multilayer metamaterials; Optical Materials Express; Jul. 28, 2011; pp. 466-479; vol. 1, No. 3.

Overvig, A. et al.; Chiral Quasi-Bound States in the Continuum; Physical Review Letters; Feb. 17, 2021; pp. 073001-1-073001-6; DOI: 10.1103/PhysRevLett. 126.073001.

Malek, S. et al.; Multifunctional resonant wavefront-shaping meta-optics based on multilayer and multi-perturbation honlocal metasurfaces; Light: Science & Applications; Aug. 3, 2022; 13 pages; https://doi.org/10.1038/s41377-022-00905-6.

Iyer, P. et al.; Unidirectional luminescence from InGaN/GaN quantum-well metasurfaces; Nature Photonics; Sep. 2020; pp. 543-548; vol. 14; https://doi.org/10.1038/s41566-020-0641-x.

Overvig, A. et al.; Wavefront-selective Fano resonant metasurfaces; Advanced Photonics; Mar. 18, 2021; pp. 026002-1-026002-11; vol. 3(2); DOI: 10.1117/1.AP.3.2.026002.

Zhou, M. et al.; Self-Focused Thermal Emission and Holography Realized by Mesoscopic Thermal Emitters; ACS Photonics; Jan. 15, 2021; pp. 497-504; vol. 8; https://dx.doi.org/10.1021/acsphotonics.0c01487.

Miller, D. et al.; Universal modal radiation laws for all thermal emitters; PNAS; Apr. 25, 2017; pp. 4336-4341; vol. 114, No. 17.

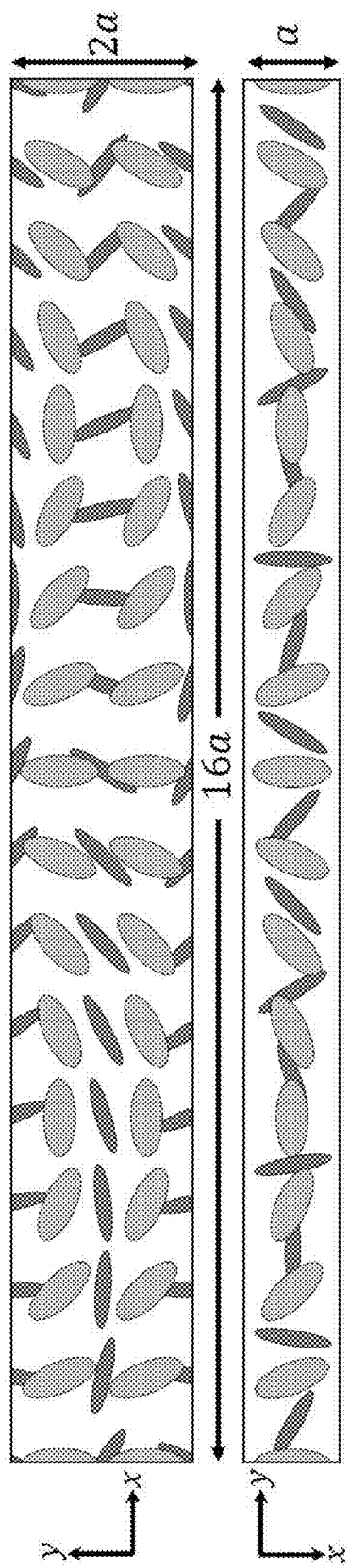

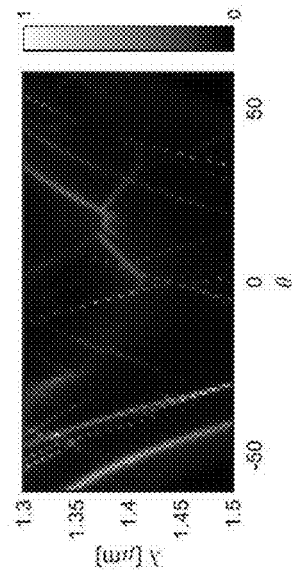
FIG. 4C
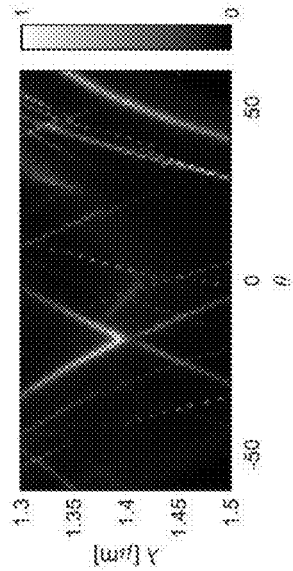
FIG. 4D
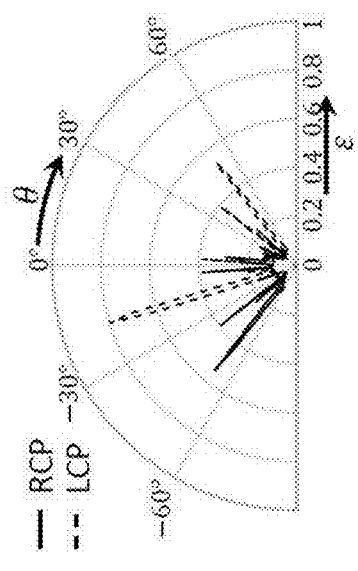
FIG. 4E
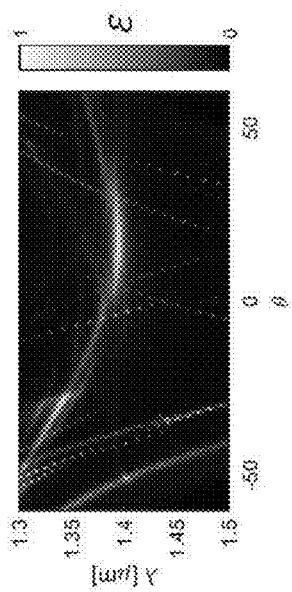
FIG. 4F
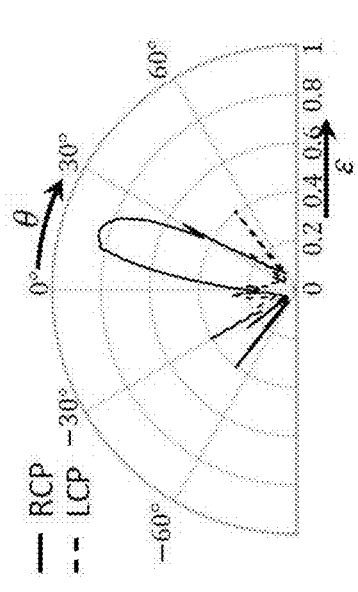
FIG. 4G
FIG. 4H FIG. 5A
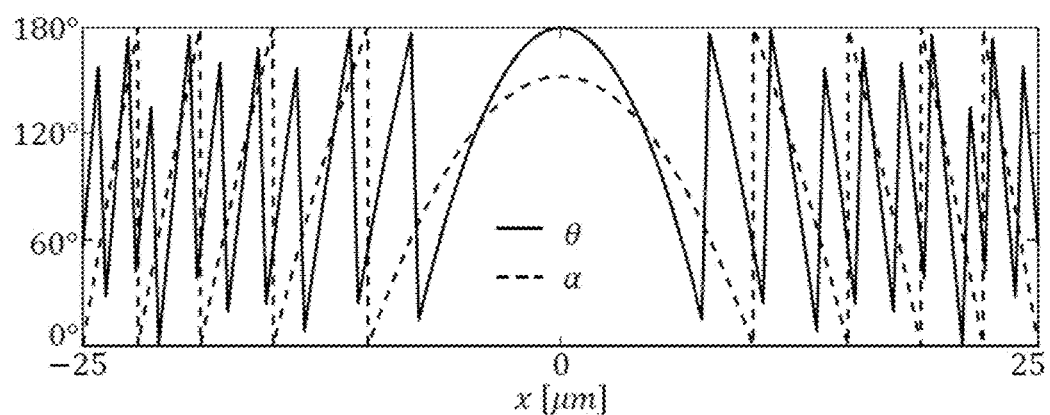
FIG. 5B
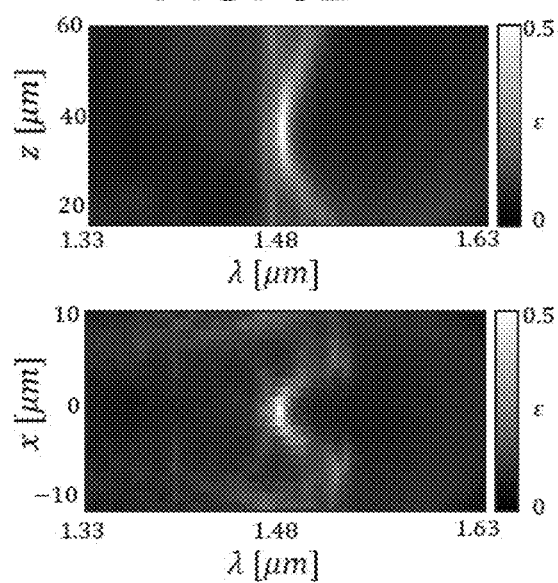
FIG. 5C
FIG. 5D    FIG. 5E
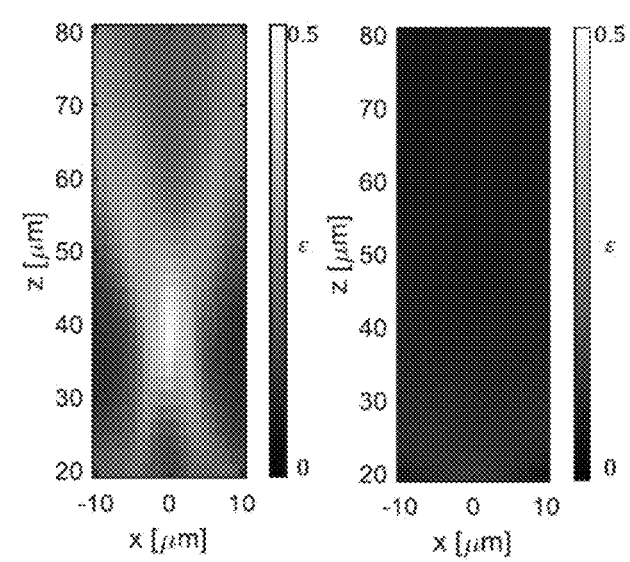

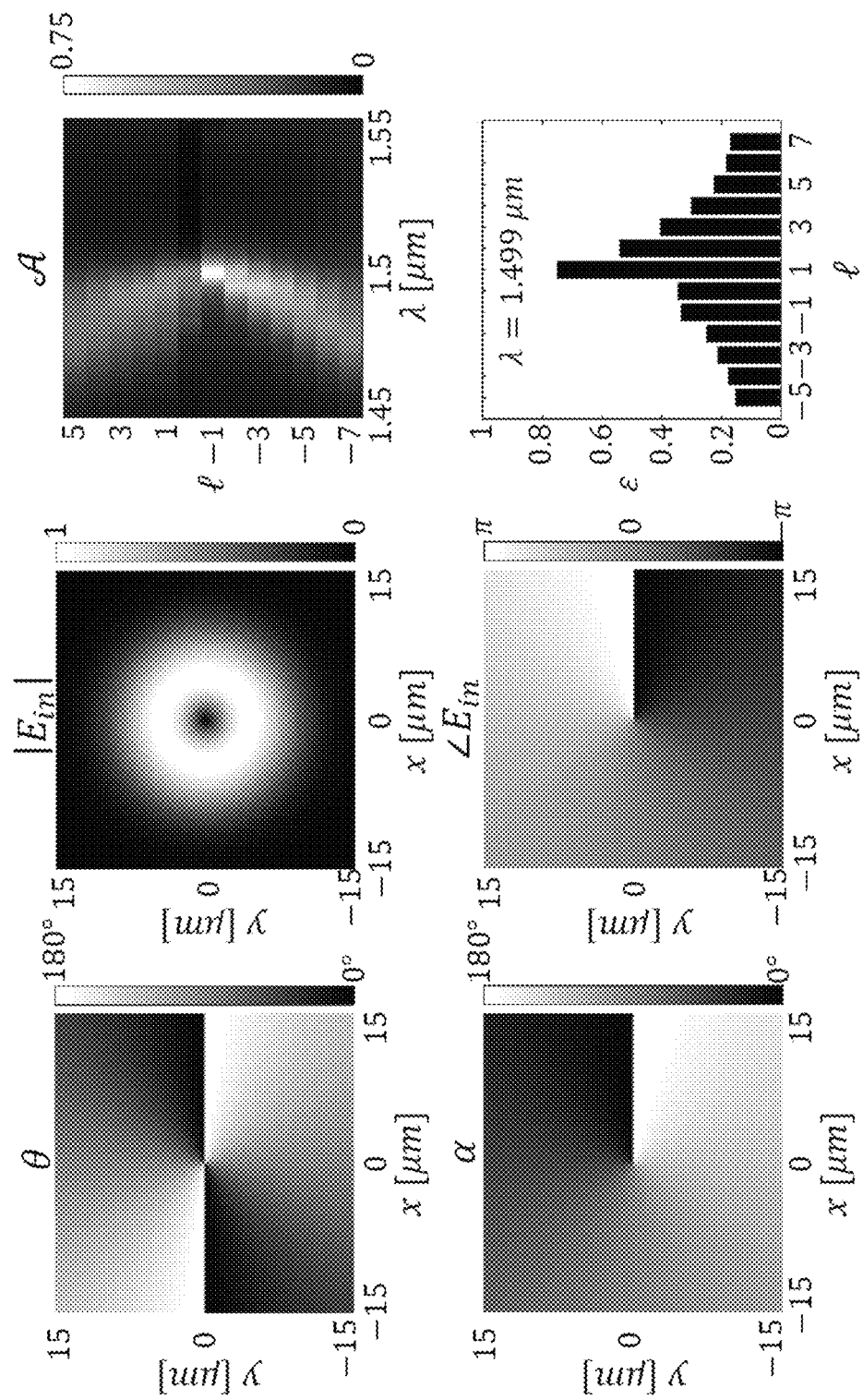

FIG. 10A
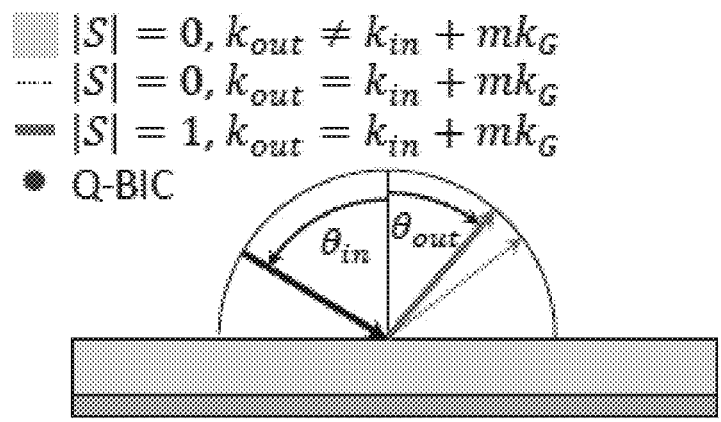
FIG. 10B
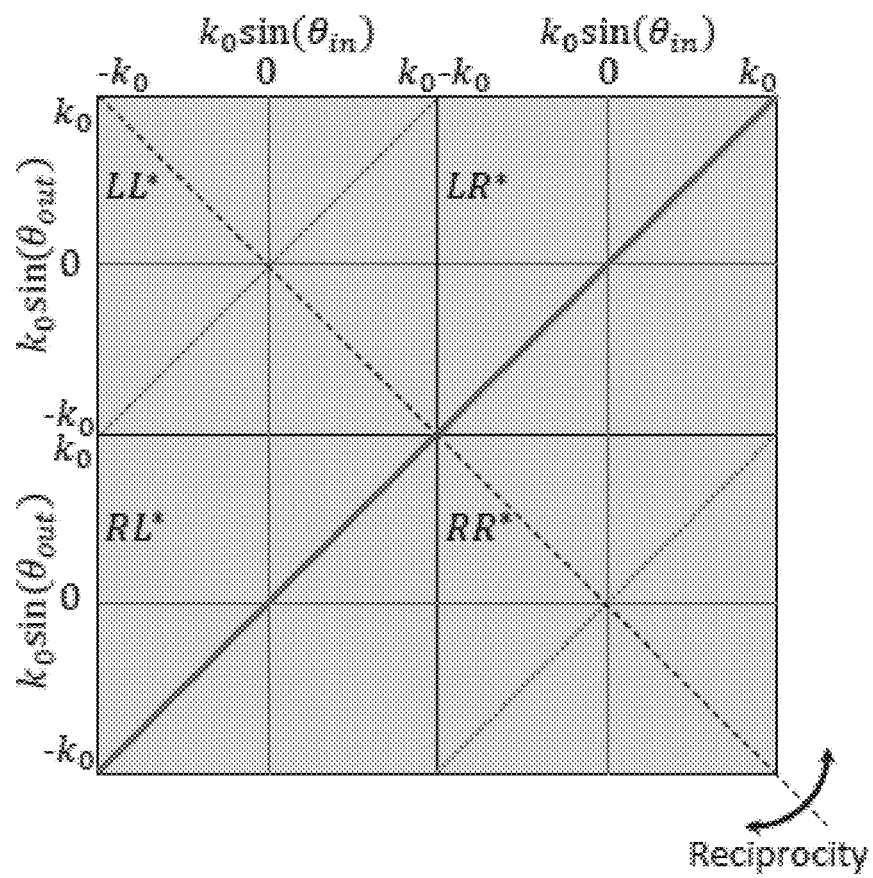
FIG. 10C
|  | (d) | (f) | (h) | (j) |
|---|---|---|---|---|
| Local phase gradient | ✗ | ✓ | ✗ | ✓ |
| Nonlocal phase gradient | ✓ | ✓ | ✓ | ✓ |
| Birefringence | ✗ | ✗ | ✓ | ✓ |

THERMAL METASURFACE COMBINING LOCAL AND NON- LOCAL LIGHT-MATTER INTERACTIONS

CROSS-REFERENCE TO RELATED APPLICATIONS

This application claims priority to and is a non-provisional of U.S. Patent Application 63/192,292 (filed May 24, 2021), the entirety of which is incorporated herein by reference.

STATEMENT OF FEDERALLY SPONSORED RESEARCH OR DEVELOPMENT

This invention was made with government support under grant numbers N000141912643 awarded by the U.S. Department of Defense Vannevar Bush Faculty Fellowship. The government has certain rights in the invention.

BACKGROUND OF THE INVENTION

Thermal emission is arguably the most established technique for producing light at optical frequencies, and its use remains ubiquitous today. Manipulation of light emitted by a blackbody proceeds by placing a series of optical elements in the optical pathway to control its spectrum, coherence properties, polarization state and spatial profile (wavefront shape). While bulky, such setups are capable of a large degree of control over light produced by a heated element. The complexity of these setups is, however, a significant drawback.

In the past decade, substantial progress has been made in the context of compactifying these setups by the use of structured optical materials, or metamaterials. Particularly, there has been significant focus in metamaterials and structured thin films (metasurfaces) aimed at manipulating externally produced coherent light (e.g., light from a laser) or light with a large degree of coherence (e.g., light that has been prepared as in the beginning stages of the bulk optics setup). These metasurfaces have been establishing an ultra-thin platform wherein designer polarization and spatial profiles are imparted to light within a subwavelength structured film. Recent demonstrations have shown complete control over phase and polarization with subwavelength spatial resolution, amplitude and phase, and even simultaneous control of amplitude, phase and polarization at a single wavelength. These devices act on the incoming wavefront by locally manipulating the impinging wavefront through their subwavelength units; nearest neighbor interactions among these elements are often ignored so that reference to a library of pre-computed optical responses may guide the configuration of a device geometry with the desired functionality. Because they operate based on independent scatterers arrayed across the surface, they are referred to as spatially 'local' metasurfaces.

While this progress has enabled exciting opportunities for compact manipulation of external, coherent sources, incorporating all stages into a single compact structure is still an outstanding challenge despite the enticing benefits regarding the size, weight and power of custom optical sources. The difficulties involved in constructing such a structure, also referred to as a 'thermal metasurface', are a direct result of the inherent incoherence involved with the fluctuations responsible for thermal emission, which is incompatible with the large spatial and temporal coherence required for conventional metasurfaces. In other words, conventional metasurfaces excited by a coherent source work well because each element is driven with a well-defined phase, enabling effective control over the transmitted or reflected wavefront. In thermal metasurfaces, on the other hand, light emanates from the metasurface elements themselves through spontaneous processes, and no coherence exists between the processes in different elements. As a result, combining all steps into one, i.e., manipulating the incoherent thermal processes to generate a partially coherent, complex wavefront is significantly more challenging than designing an externally and coherently driven metasurface with complex functionalities. An improved thermal metasurface is therefore desirable.

The discussion above is merely provided for general background information and is not intended to be used as an aid in determining the scope of the claimed subject matter.

SUMMARY

A thermal metasurface that provides a planar optical source based on thermal radiation or photoluminescence. The thermal metasurface provides dual perturbative control of both radiative and non-radiative lifetimes of a q-BIC via geometric and material perturbation of monomeric and dimeric pillars.

In a first embodiment, a thermal metasurface is provided. The thermal metasurface comprising: a dielectric slab with refractive index $n_1$, a first plurality of pillars with asymmetric shapes arrayed with a pitch distance P wherein each $i^{th}$ pillar in the first plurality of pillars is oriented at an angle $\theta_i$ relative to a longitudinal axis of the dielectric slab; a second plurality of pillars with asymmetric shapes displaced a distanced from the first plurality of pillars, wherein each $j^{th}$ pillar in the second plurality of pillars is oriented at an angle $\alpha_j$ relative to the longitudinal axis of the dielectric slab, wherein the angle $\theta_i$ is different than the angle $\alpha_j$; a third plurality of pillars with asymmetric shapes displaced by the pitch distance P from the second plurality of pillars, wherein each $j^{th}$ pillar in the third plurality of pillars is oriented at an angle $\alpha_j+90°$ relative to the longitudinal axis of the dielectric slab; and wherein the first, second and third plurality of pillars are disposed above the dielectric slab.

In a second embodiment, a thermal metasurface is provided. The thermal metasurface comprising: a dielectric slab with refractive index $n_1$, a dielectric film with refractive index $n_2$ that is different than $n_1$, wherein the dielectric film has optical losses $k_1$ supporting thermal emission or photoluminescent emission, the dielectric film being disposed above, and contiguous with, the dielectric slab; a first plurality of pillars with asymmetric shapes arrayed with constant pitch distance P wherein each $i^{th}$ pillar in the first plurality of pillars is oriented at an angle $\theta_i$ relative to a longitudinal axis of the dielectric slab; a second plurality of pillars with asymmetric shapes displaced a distanced from the first plurality of pillars, wherein each $j^{th}$ pillar in the second plurality of pillars is oriented at an angle $\alpha_j$ relative to the longitudinal axis of the dielectric slab, wherein the angle $\theta_i$ is different than the angle $\alpha_j$; a third plurality of pillars with asymmetric shapes displaced by the pitch distance P from the second plurality of pillars, wherein each $j^{th}$ pillar in the third plurality of pillars is oriented at an angle $\alpha_j+90°$ relative to the longitudinal axis of the dielectric slab; and wherein the first, second and third plurality of pillars are disposed above the dielectric slab.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 4A shows the superperiod of a thermal metasurface designed to emit RCP light at non-normal incidence, with low spatial coherence.

FIG. 4B shows a superperiod designed to emit LCP light at non-normal incidence, with high spatial coherence.

FIG. 4C and FIG. 3D are RCP and LCP emission maps for the device in FIG. 4A as a function of wavelength and altitude in the x direction, $\theta_x$.

FIG. 4E shows emission patterns for the device in FIG. 4A at the wavelength of the quasi-BIC's band edge (dashed contours in FIGS. 4C and 4D). The band is flat near the band-edge, meaning the spatial coherence is low and the emitted lobe is broad.

FIG. 4F and FIG. 4G show RCP and LCP emission maps for the device in FIG. 4B as a function of wavelength and altitude in the y direction, $\theta_y$.

FIG. 4H show emission patterns for the device in FIG. 4B at the wavelength of the quasi-BIC's band-edge (dashed contours in FIG. 4F and FIG. 4G). The band is not flat near the band-edge, meaning the spatial coherence is high and the emitted lobe is narrow.

FIG. 5A shows angular parameters of the thermal metasurface producing focused thermal emission.

FIG. 5B shows a RCP emission map as a function of wavelength and position z along the optical axis (x=0).

FIG. 5C shows a RCP emission map as a function of wavelength and position x at the focal plane (z=40 μm).

FIG. 5D depicts a profile of emitted light near the focal spot of the device for the band-edge wavelength.

FIG. 5E depicts a profile of emitted light near the focal spot of the device for the non-resonant wavelength.

FIG. 6B and FIG. 6C show angular parameters defining a 30×30 μm thermal metasurface generating RCP light with an OAM of $)^{|\ell|/2}$ =1 at λ=1.5 μm.

FIG. 6D and FIG. 6E shows an example electric field profile of LCP light launched in full-wave simulations to study the absorption of normally incident OAM light.

FIG. 6F shows absorption spectra for various OAM beams such as that depicted in FIG. 6D and FIG. 6E.

FIG. 6G shows emissivity into the OAM channels at the peak wavelength, Δ=1.499 μm, showing preferential emission to the designed OAM order and emission with overall net OAM.

FIG. 8C-8F is shown in FIG. 1A, FIG. 1B and FIG. 2 with the values θ=α=0.

FIG. 10A provides Definitions and conventions for the continuous scattering matrices.

FIG. 10B depicts the behavior of a specular mirror (which conserves linear momentum and flips the spin upon reflection).

FIG. 10C shows summary of the behavior of the four devices studied.

DETAILED DESCRIPTION OF THE INVENTION

A thermal metasurface should have at least some of several features: first, the thermal metasurface should have a local element controlling both the local scattering phase and the relative phase between x and y polarizations, i.e., the degree of birefringence. Second, the thermal metasurface should support a symmetry-protected BIC (bound state in the continuum) as unaffected as possible by the geometric perturbations that govern the local scattering. At minimum, the Q-factor should remain infinite regardless of the chosen phase and degree of birefringence; there should be non-zero scattering only in the presence of additional perturbations. This generally excludes q-BICs (quasi-bound states in the continuum) supported by monatomic lattices and suggests instead the use of q-BICs folded into the continuum by a period-altering perturbation. Ideally, the resonant frequency should be invariant to, for instance, the in-plane orientation of the structural birefringence, but at minimum the resonant frequency should be adjustable by both the local response and perturbation such that a constant resonant frequency may be achieved for any local response. Third, in order to access circular polarizations, the device should be optically chiral. This suggests (though, due to the mirror plane, does not require) placing the symmetry-breaking perturbation at a distinct plane from the local response. Fourth, the symmetry-protected BIC should be controlled by a perturbation with control over both the eigenpolarization and Q-factor; this process may be guided by selection rules to choose an appropriate perturbation for the chosen mode.

Figure 1A:
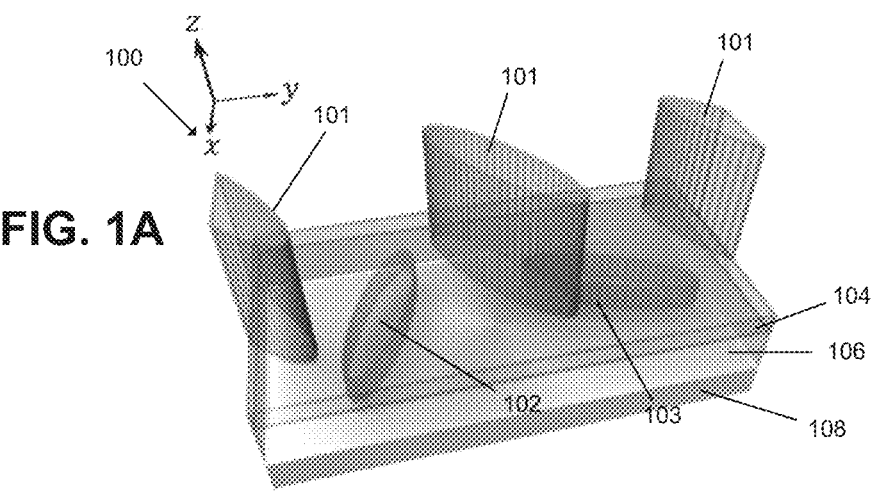
FIG. 1A is a perspective view of a structured silicon film sitting atop a PEC with a dielectric filler in between. The top silicon elliptical pillars are monomers, and the bottom are dimers. (b)
Figure 1B:
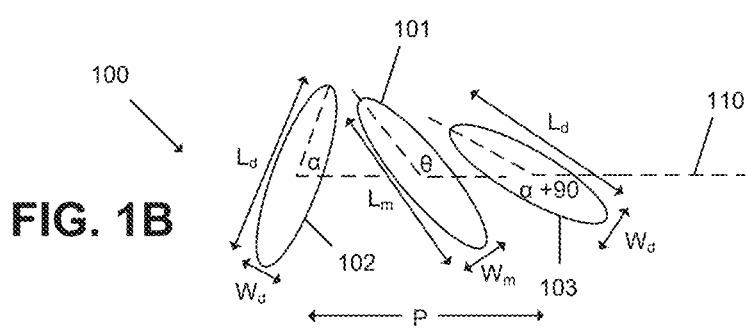
FIG. 1B shows top and side views of the unit cell in FIG. 1A, defining the geometric and material parameters.
Figure 1C:
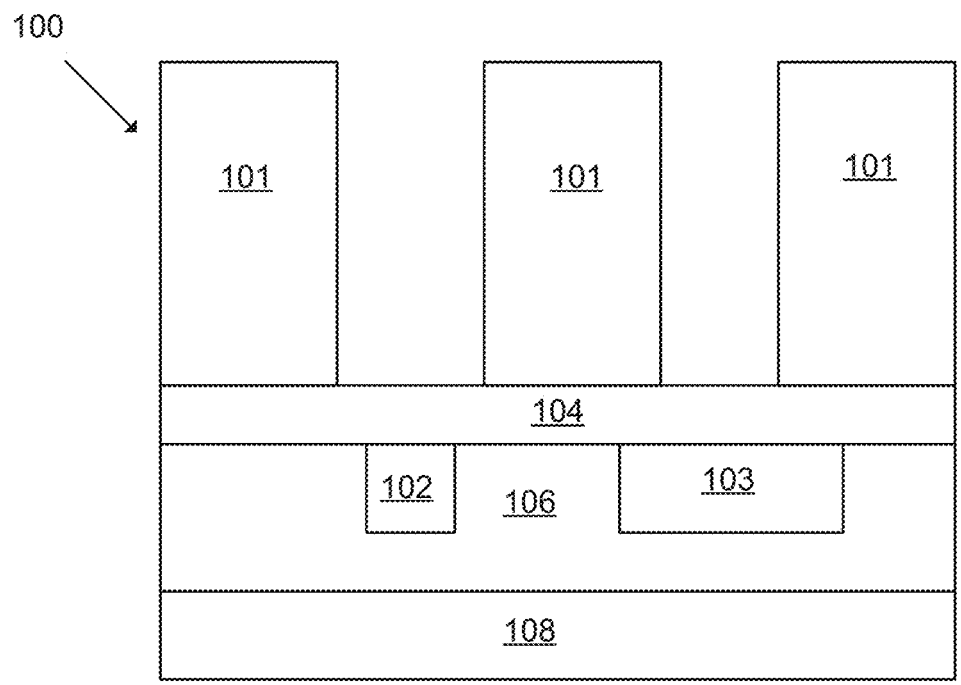
FIG. 1C shows a cross-section of an example quasi-BIC supported by this structure and controlled by the dimer.

Based on these considerations, a thermal metasurface is presented in FIG. 1A, FIG. 1B and FIG. 1C. These guidelines suggest starting with a monatomic lattice of elliptical dielectric pillars with complete control over the phase and polarization of locally scattered light, and then adding a dimerizing perturbation at a different plane. Such an unperturbed lattice satisfies the first feature above; the addition of the dimerizing perturbation satisfies the second feature by accessing a q-BIC folded into the continuum by the period doubling; and placing the perturbation at a separate plane satisfies the third feature regarding chirality. The fourth feature may be satisfied by using a perturbation with a p2 space group, allowing simultaneous control over the scattering rate and polarization angle scattered at the interface where the perturbation is placed.

The theory governing the design of the disclosed structures will be provided after a structural description is provided.

Figure 2:
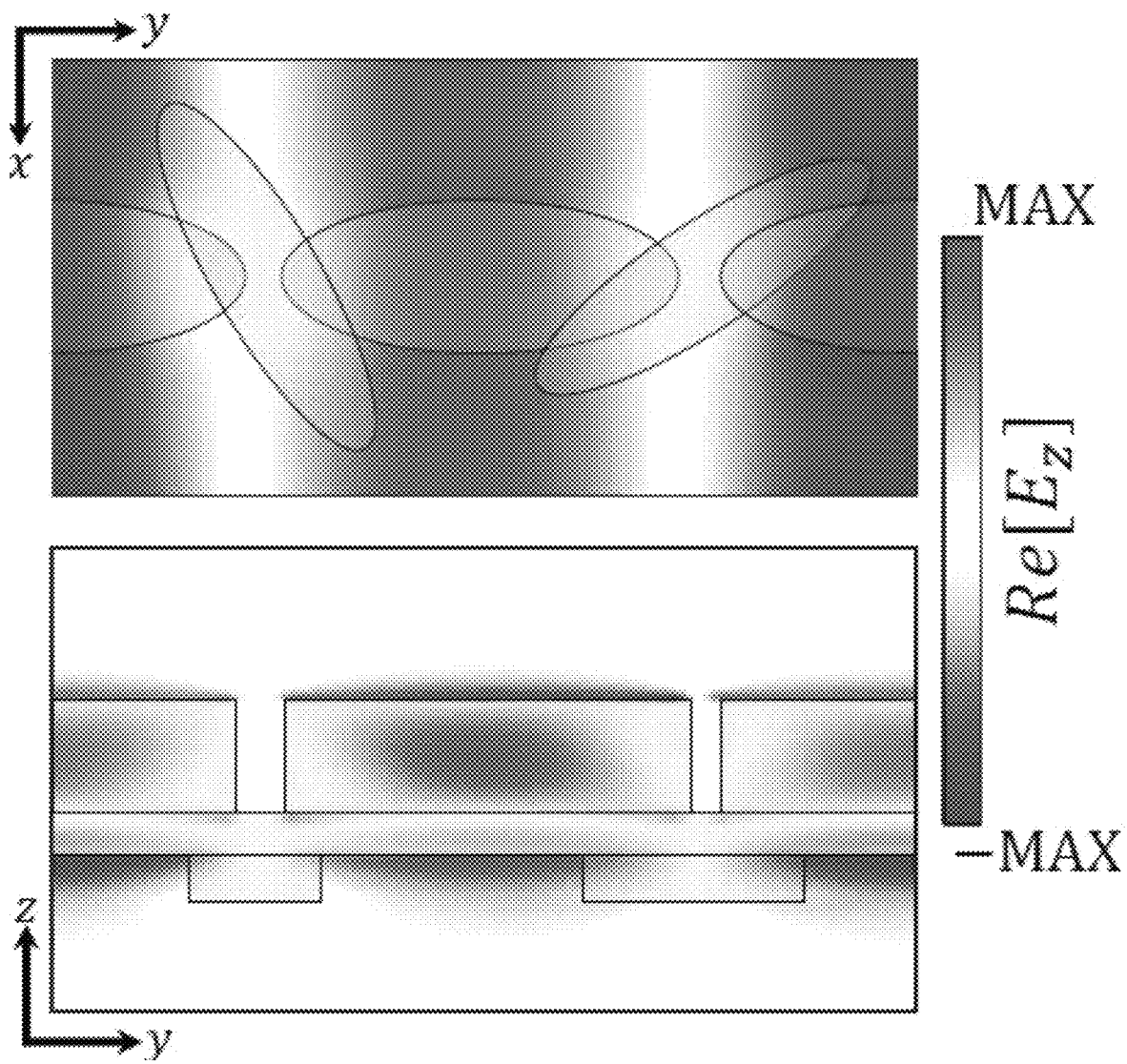
FIG. 2 shows top and cross-sections of an example quasi-BIC supported by this structure and controlled by the dimer.

As seen in FIG. 1A and FIG. 1B the example thermal metasurface 100 is a monatomic array of doped elliptical pillars 101 sitting on a perturbed doped silicon slab within a p2 space group. The thermal metasurfaces disclosed in this specification may be formed using conventional fabrication techniques including, but not limited to, e-beam lithography. The pillars may comprise high index (n>2) materials such as common semiconductors and ceramics: silicon, germanium, aluminum nitride, gallium nitride, gallium arsenide, aluminum arsenide, indium antimonide, silicon carbide, diamond, or titanium dioxide. Each first pillar 101 is spaced from adjacent first pillars 101 by a constant pitch distance P, where P is between 50 nm and 5 microns. In FIG. 1A, the thermal metasurface 100 sits atop a perfect electric conducting (PEC) 108 in a ground plane and a low index lossless dielectric slab 106 fills the volume between the PEC and the silicon structure. The dielectric slab 106 may be made of materials such as silicon dioxide, calcium fluoride, polymeric materials such as polymethyl methacrylate, silicon nitride, or alumina. The dielectric slab 106 has an index blow than of the pillars 101, 102 and 103 and is typically below 2. The dielectric slab 106 is generally between 50 nm and 15 microns in thickness. In some embodiments, a dielectric film 104 is present, composed of the same class of materials as the pillars 101, 102 and 103. The dielectric film 104 is generally between 50 nm and 15 microns in thickness. The monatomic array of first pillars 101 controls the local scattering (phase and polarization), and so it may be referred to as the local element or the monomer, with height $H_m$, length $L_m$, and width $W_m$. The in-plane dimensions (length and width) are generally between 50 nm and 5 microns while the out of plane dimension (height) is generally between 50 nm and 15 microns. Since, in general, the in-plane orientation angle of the dielectric pillars θ will be varied (relative to a longitudinal axis 110), a symmetry-protected BIC is targeted whose field profile overlaps so as to be minimally affected by such rotation. A mode with this property is the transverse-magnetic mode (characterized primarily by an electric field pointing out of plane) that has its electric field concentrated within the high-index pillars (see FIG. 2). Selection rules (A. C. Overvig, S. C. Malek, M. J. Carter, S. Shrestha, and N. Yu, "Selection rules for quasibound states in the continuum", Phys. Rev. B 102, 035434 (2020)) are used to determine the appropriate p2 perturbation that accesses this mode. The perturbation is a set of thin elliptical pillars (second pillars 102 and third pillars 103) centered between the local pillars (e.g. the first pillar 101 is flanked by the dimeric second and third pillars, 102, 103) and oriented at angles α and α+90° (forming a dimer). The second pillars 102 are spaced from the third pillars 103 by the same pitch distance P that separates adjacent first pillars 101. The second pillars 102 are spaced from the first pillars 101 by a distance d. These features control the symmetry-breaking response governing the nonlocal q-BIC, and are referred to as the nonlocal element or the dimer (height $H_d$, length $L_d$, and width $W_d$). Like the first pillars 101, the in-plane dimensions (length and width) are generally between 50 nm and 5 microns while the out of plane dimension (height) is generally between 50 nm and 15 microns. In one embodiment, the first, second and third pillars 101, 102 and 103 all have the same height (i.e. $H_m = H_d$).

Figure 3A:
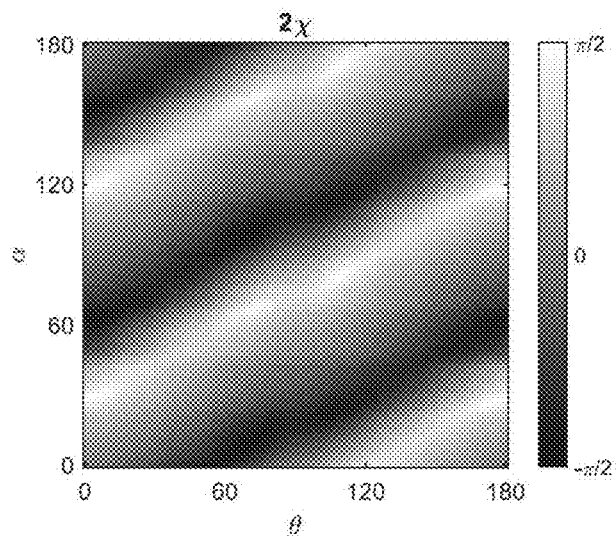
FIG. 3A and FIG. 3B shows the latitude and longitude on the Poincaré sphere of the quasi-BIC in FIG. 2 of the absorbed polarization state as the geometric parameters $\theta$ and $\alpha$ are varied.
Figure 3B:
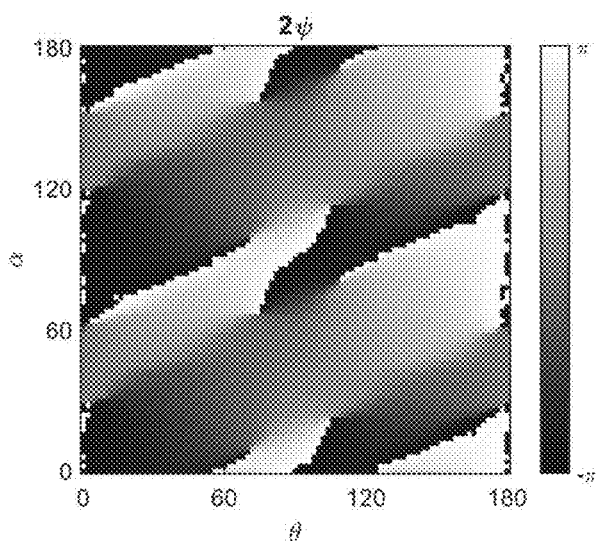
Figure 3C:
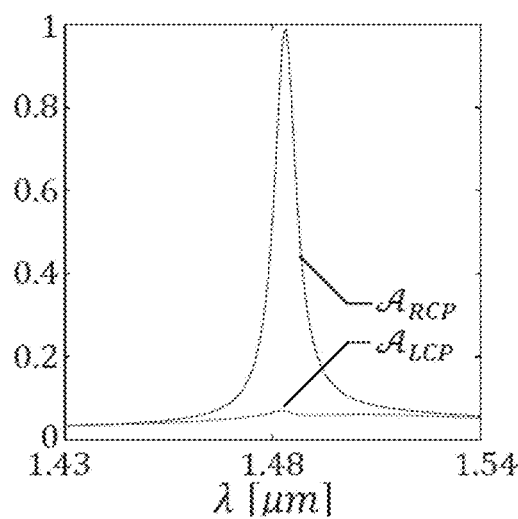
FIG. 3C shows circularly dichroic absorption spectra for the geometry depicted in FIG. 2.

The q-BIC may be critically coupled by adjusting both the magnitude of the perturbation ($H_d$, $L_d$, $W_d$) of the second and third pillars 102, 103 to match the local amount of loss introduced by doping (k). As usual for non-degenerate Fano resonances, this absorption is dichroic: the device will perfectly absorb one polarization state but not the orthogonal state. By choosing the monomer's birefringence to be the one of a halfwave plate, i.e., described by Eq. (43), the absorbed polarization state may be any arbitrary elliptical state. FIG. 3A and FIG. 3B show, as a function of the orientation angles of the monomer θ and dimer α, the latitude 2χ and longitude 2φ on the Poincaré sphere describing the absorbed, and hence thermally emitted, state. It is clear that by simultaneously varying θ and α any emitted polarization state is possible. This behavior may be roughly understood as follows: the dimer scatters the q-BIC near the PEC interface to a linear polarization oriented at an angle $\phi \approx 2\alpha$, which then travels through the local element adjusted by the Jones matrix $$J = \exp(i\Phi_C/2)\begin{bmatrix} \cos(\theta) & -\sin(\theta) \\ \sin(\theta) & \cos(\theta) \end{bmatrix}\begin{bmatrix} 1 & 0 \\ 0 & i \end{bmatrix}\begin{bmatrix} \cos(\theta) & \sin(\theta) \\ -\sin(\theta) & \cos(\theta) \end{bmatrix}, \quad (1)$$

representing the single-pass behavior of the local element as a quarter waveplate layer oriented at an angle θ. The emitted state has the form $$|d\rangle = J\begin{bmatrix} \cos(2\alpha) \\ \sin(2\alpha) \end{bmatrix} = \exp(i\Phi_c/2)\frac{1+i}{2}\begin{bmatrix} \cos(\phi) - i\cos(2\theta - \phi) \\ \sin(\phi) - i\sin(2\theta - \phi) \end{bmatrix}. \quad (2)$$

FIG. 1C depicts the thermal metasurface 100 and shows the first plurality of pillars 101 contiguous with, and extending above, the dielectric film 104. The second plurality of pillars 102 and the third plurality of pillars 103 are contiguous with, and extend below, the dielectric film 104 such that the second plurality of pillars 102 and the third plurality of pillars 103 are coplanar. The first plurality of pillars 101 are present in a first plane and the second plurality of pillars 102 and the third plurality of pillars 103 are present in a second plane, wherein the second plane is below the first plane. The second plurality of pillars 102 and the third plurality of pillars 103 are imbedded within the dielectric slab 106.

Figure 1D:
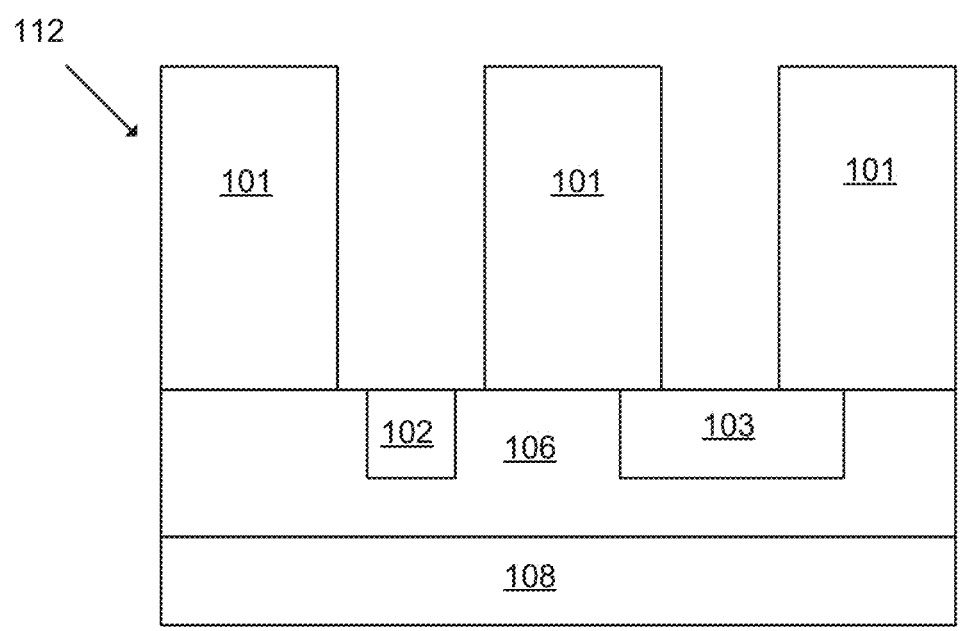
FIG. 1D shows another a cross-section of an example quasi-BIC supported by this structure and controlled by the dimer.

FIG. 1D depicts a thermal metasurface 112 that is similar to the thermal metasurface 100 except in that the dielectric film is omitted. The second plurality of pillars 102 and the third plurality of pillars 103 are contiguous with, and extend below, the dielectric slab 106 such that the second plurality of pillars 102 and the third plurality of pillars 103 are coplanar. The second plurality of pillars 102 and the third plurality of pillars 103 are imbedded within the dielectric slab 106.

Figure 1E:
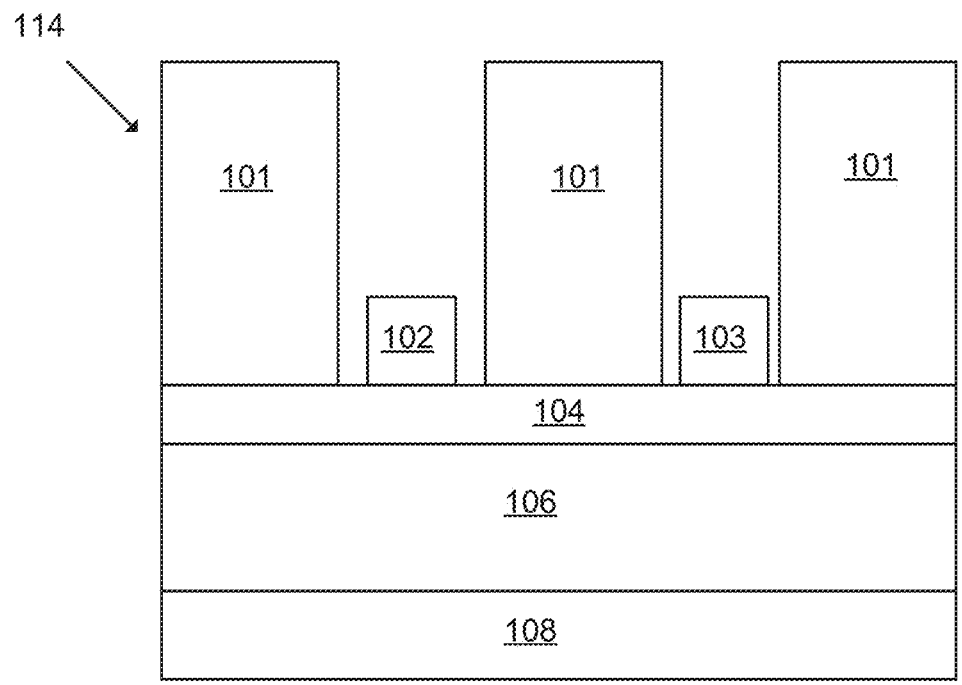
FIG. 1E shows another a cross-section of an example quasi-BIC supported by this structure and controlled by the dimer.

FIG. 1E depicts a thermal metasurface 114 that is similar to the thermal metasurface 100 except in that the second plurality of pillars 102 and the third plurality of pillars 103 are contiguous with, and extend above, the dielectric film 104 such that the first plurality of pillars 101, the second plurality of pillars 102 and the third plurality of pillars 103 are coplanar.

Figure 1F:
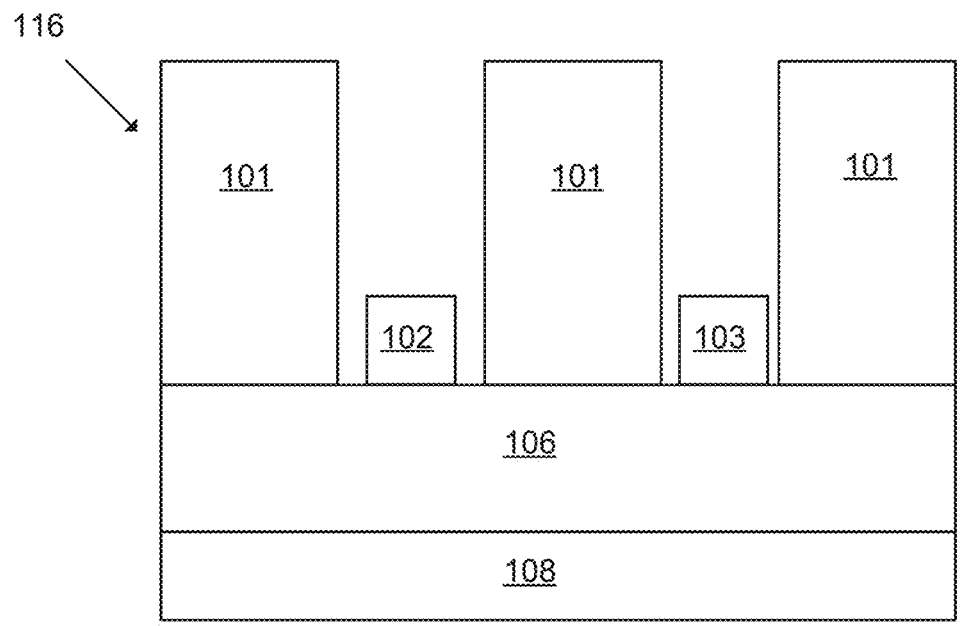
FIG. 1F shows another a cross-section of an example quasi-BIC supported by this structure and controlled by the dimer.

FIG. 1F depicts a thermal metasurface 116 that is similar to the thermal metasurface 104 except in that the dielectric film is omitted. The second plurality of pillars 102 and the third plurality of pillars 103 are contiguous with, and extend above, the dielectric slab 106 such that the first plurality of pillars 101, the second plurality of pillars 102 and the third plurality of pillars 103 are coplanar. The second plurality of pillars 102 and the third plurality of pillars 103 are imbedded within the dielectric slab 106.

More rigorously, this system can be described with TCMT. The background scattering matrix in this case is $$C = \exp(i\Phi_C)\begin{bmatrix} \cos(2\theta) & \sin(2\theta) \\ \sin(2\theta) & -\cos(2\theta) \end{bmatrix}. \quad (3)$$

Solutions for $|d\rangle$ satisfying Eqs. (36) and (37) may be found. Guided by the form expected by Eq. (2), the solution is $$|d\rangle = \sqrt{2\gamma_r}\frac{1+i}{2}\begin{bmatrix} \cos(\phi) + i\cos(2\theta - \phi) \\ \sin(\phi) + i\sin(2\theta - \phi) \end{bmatrix}e^{i\Phi_c/2}, \quad (4)$$

where $\phi \approx 2\alpha$ is the linear polarization scattered by the dimer. Since for initial demonstrations of thermal metasurfaces geometric phase engineering for circularly polarized emitted light was the focus, the value of $\phi_c$ is an arbitrary constant; set to 0 for now. Appendix A of U.S. Patent application 63/192,292 (incorporated by reference) shows that, by including it (by varying propagation phase), the present results are generalized to any arbitrary polarization state. The resulting scattering matrix when $\omega = \omega_0$ and $\gamma_i = \gamma_r$, is then $$S = \frac{i}{2} \begin{bmatrix} (\sin(\Delta) - i\sin(\phi))^2 & 1/2(\sin(2\Delta) + \sin(2\phi) - 2i\sin(2\theta)) \\ 1/2(\sin(2\Delta) + \sin(2\phi) - 2i\sin(2\theta)) & (\cos(\Delta) - i\cos(\phi))^2 \end{bmatrix}, \quad (5)$$

where $\Delta = \phi - 2\theta$. Appendix A of U.S. Patent application 63/192,292 provides the full general form of the scattering matrix. This matrix is symmetric and singular, meaning it must have a zero eigenvalue. The eigenvector associated with the zero eigenvalue is $$|e\rangle = \begin{bmatrix} \cos(\phi) - i\cos(\phi - 2\theta) \\ \sin(\phi) + i\sin(\phi - 2\theta) \end{bmatrix}, \quad (6)$$

Implying that the emitted state is:

$$|e^*\rangle = \begin{bmatrix} \cos(\phi) + i\cos(2\theta - \phi) \\ \sin(\phi) + i\sin(2\theta - \phi) \end{bmatrix}. \quad (7)$$

This may be written in the more suggestive form $$|e^*\rangle = \begin{bmatrix} \cos(\psi) & -\sin(\psi) \\ \sin(\psi) & \cos(\psi) \end{bmatrix} \begin{bmatrix} \cos(\chi) \\ i\sin(\chi) \end{bmatrix}, \quad (8)$$

which is a parameterization of an elliptical polarization with $\psi = \theta$ and $\chi = \theta - \phi \approx \theta - 2\alpha$. The TCMT model agrees well with the full-wave simulations in FIG. 3A and FIG. 3B.

Notably, $\chi$ is roughly constant for contours following $2\alpha \approx \theta + \beta$, where $\beta$ is some constant angle. In particular, for $\beta = 45°$, the device emits RCP light. But for $\beta$ slightly off from this condition, it absorbs a state nearly fully circularly polarized ($\chi \approx \pi/4$) but with $\psi = \theta$, i.e., $$|e^*\rangle \approx \frac{1}{\sqrt{2}} \begin{bmatrix} \cos(\theta) & -\sin(\theta) \\ \sin(\theta) & \cos(\theta) \end{bmatrix} \begin{bmatrix} 1 \\ i \end{bmatrix} = \frac{1}{\sqrt{2}} e^{-i\theta} \begin{bmatrix} 1 \\ i \end{bmatrix} \quad (9)$$

meaning that there is a geometric phase associated with coupling to this q-BIC, $\phi_{geo} = -\theta$, and therefore a thermal metasurface comprising the structures in FIGS. 1A-1C may emit narrowband circularly polarized light at any locally defined phase. For any other polarization, such as linear, $\phi_c$ in Eq. (1) may be adjusted by judicious control of $L_m$, $W_m$ (see Appendix A of U.S. Patent application 63/192,292). Restricting to the convenient sub-library targeting circularly polarized light controlled by a geometric phase allows one to keep $L_m$, $W_m$ fixed. FIG. 6C depicts circularly dichroic absorption spectra for the geometry depicted in FIG. 2.

As a demonstration, FIG. 4A, FIG. 4B, FIG. 4C, FIG. 4D, FIG. 4E, FIG. 4F, FIG. 4G, and FIG. 4H show two devices with unidirectional spin-selective emission obtained by implementing a phase gradient based on geometric phase engineering. In the first device, FIG. 4A, the phase gradient is applied in the x direction, which is orthogonal to the dimerization direction. In the second example, FIG. 4B, the phase gradient is applied in the y direction, i.e., in the same direction as the dimerization. The geometrical parameters for these devices are given in Appendix F of U.S. Patent application 63/192,292. Connecting to the general discussion around FIGS. 4A-4H, the nonlocal parameter $\alpha$ varies at half the pace of the local parameter $\theta$, i.e., the dimer pattern (dark gray) has twice the period of the monomer pattern (light gray) in FIGS. 4A, 4B, implying that the resulting metasurfaces support twice as many diffraction orders as expected from the purely local response. This implies that for the geometries in FIGS. 4A, 4B the diagrams in FIGS. 10A-10K (detailed elsewhere in this specification) sketch only the diffraction orders associated with the local response or, equivalently, depict only the even diffractive orders.

The spectral emissivity along the $\theta_x$ direction for the first device is shown in FIG. 4C for RCP and FIG. 4D for LCP. These plots are produced by recording the absorption of circularly polarized planewaves incident to the device at each angle $\theta_x$ (calculated using the finite difference time domain method using a commercial software by Lumerical Solutions) and then invoking Kirchhoff's law. A band-edge mode with near-unity emissivity arises near $\lambda = 1.4$ μm and $\theta_x = 18°$ for RCP, but it is absent for the symmetric band at $\theta_x = -18°$ for LCP. The angular emission profile at the band-edge frequency is shown in FIG. 4E, showing a stark contrast for LCP and RCP, and confirming the largely spin-selective and directional features of the thermal emission. The unwanted sidelobes are due to other modes supported by the structure, but they are (1) not near-unity in emissivity and (2) do not show a marked discrepancy between LCP and RCP. Indeed, they show the conventional behavior of geometric phase metasurfaces: for every LCP peak there is an RCP peak at an equal and opposite angle. In general, since they are not specifically engineered by the thermal metasurface geometrical parameters, they tend to be washed out when considering thermal metasurfaces with aperiodic wavefronts, as considered in the following examples.

Focused thermal emission with selected spin is possible by varying the emission angle across the device. Shown in FIG. 5A, the orientation of the monomer and dimer in the array are varied to match the hyperbolic phase function required by a cylindrical metasurface lens focusing along the x direction. The thermal behavior of the device is then studied with full-wave simulations by recording the absorption of energy emanating from circularly polarized point sources placed at arbitrary locations in the x, z plane. By the $4^{th}$ modal radiation law, the resulting map of absorption is equivalent to the intensity pattern of emitted light near the designed focal spot of the device. FIG. 5B and FIG. 5C map the spectral emissivity along the optical axis and across the focal plane, respectively, showing that light emitted at the band-edge frequency is indeed focused. FIG. 5D and FIG. 5E depict the cross sections marked in FIG. 5B and FIG. 5C for the band-edge frequency and a non-resonant frequency, respectively, showing focused thermally emitted RCP light at the band-edge frequency and negligible emission for the other frequency. Despite the presence of the side-peaks in FIGS. 4A-4H, their impact is washed out here due to (1) their comparably sharper angular dispersion and (2) only contributing at a given frequency for a portion of the area of the device. In comparison, the targeted q-BIC is resonant across the entire device, at a single frequency.

Figure 6A:
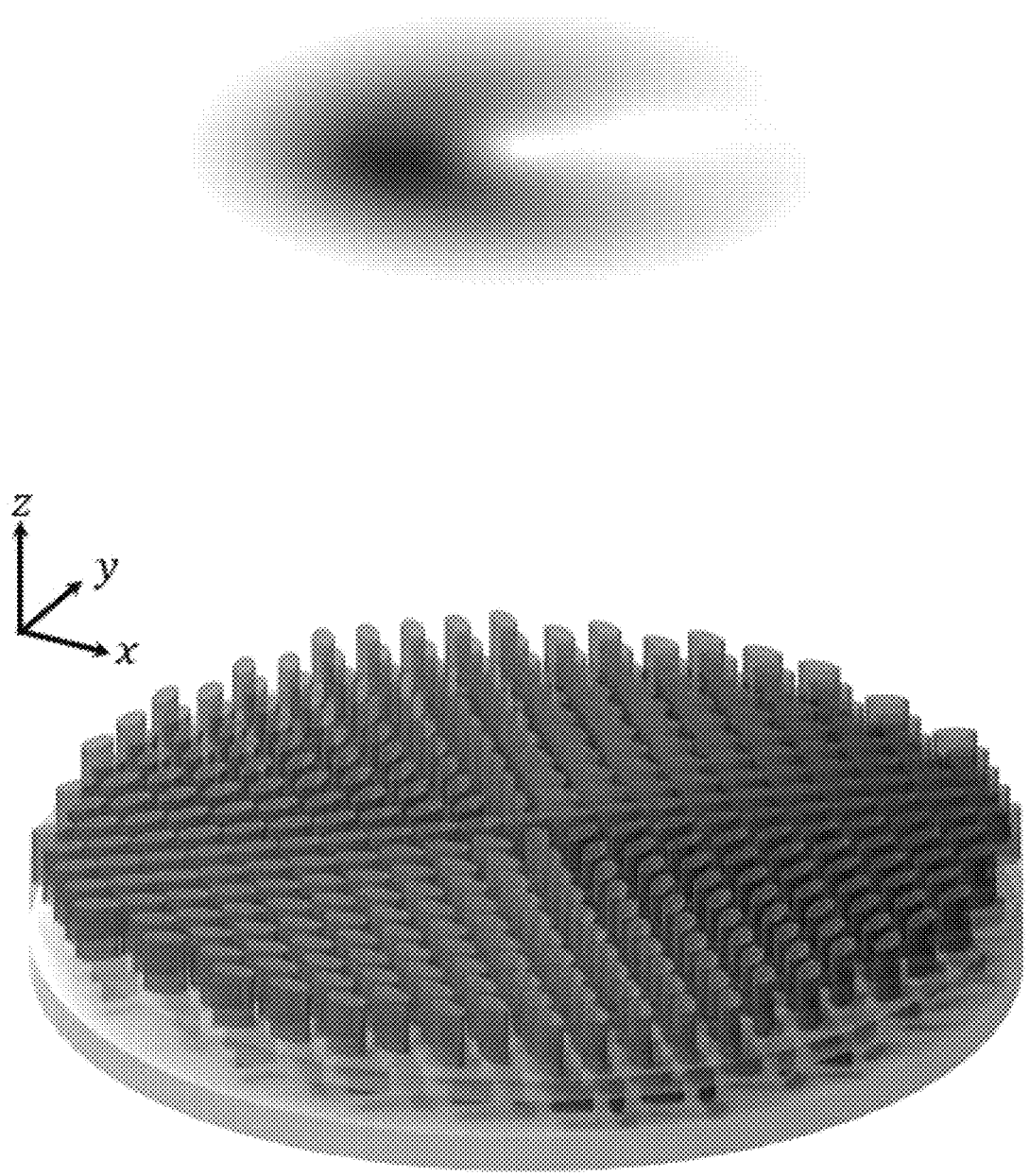
FIG. 6A is a schematic of a thermal metasurface with an azimuthally varying directivity.

Thermal metasurfaces are capable of preferentially emitting quasi-monochromatic light with arbitrary SAM and OAM. Schematically envisioned in FIG. 6A, such a thermal metasurface is designed to preferentially absorb an azimuthally varying phase profile. FIG. 6B and FIG. 6C map the required in-plane orientation angles of the local and nonlocal elements of the device aimed at producing the OAM beam mapped in FIG. 6D and FIG. 6E. Note that an alternate device geometry was used for this demonstration due to its improved performance; the details of the geometry of this device are given in Appendix F of U.S. Patent application 63/192,292 along with a brief discussion of other possible thermal metasurface implementations following the basic requirements outlined above. To study the emitted light of such a device, the absorption due to excitation by normally incident OAM beams of varying OAM integer $\ell$ was recorded. That is, the absorption due to excitation by waves was calculated $$E(x,y)=A_0(x^2+y^2)^{|\ell|/2} \exp(-(x^2+y^2)/w_0^2)\exp(i2\ell\, a\tan 2(y,x)), \qquad (10)$$

where $w_0$ is the beam waist and $A_0$ determines the field strength. Since the OAM basis is complete, a simulation for all values of $\ell$ exhaustively characterizes the emission of the device at normal incidence. However, a completely exhaustive demonstration would require an infinite number of simulations spanning both all values of $\ell$ and all incident angles. The demonstration is limited to normal incidence, and test values of $\ell$ near the designed value. Shown in FIG. 6F, at the band-edge frequency, the designed OAM is strongly absorbed, but for other values of $\ell$ a weaker and spectrally shifted absorption is observed. Consequently, at the band-edge frequency, light with net OAM is emitted, with efficiencies to each order $\ell$ depicted in FIG. 6G.

The pattern in FIG. 6F strongly resembles the band structure of the underlying q-BIC, seen in FIGS. 4A-4H for instance. Since $\ell$ determines the integer number of $2\pi$ that the incoming phase is azimuthally wrapped, it tracks the direction and magnitude of the incoming angle at a given point across the device. A correspondence between the linear and azimuthal phase gradients is therefore expected: just as a thermal metasurface with a linear phase gradient shifts the band structure so that the band-edge mode emits to a non-zero angle, a thermal metasurface with an azimuthal phase gradient shifts the preferred emissivity to a non-zero $\ell$. The exhaustive demonstration of this equivalent physics for linear momentum shifts in FIGS. 4A-4H therefore supplies strong evidence that the limited set of simulations in FIGS. 6A-6G is indeed representative of the emission of the device.

The purity of the generated OAM in FIGS. 6A-6G is limited primarily by practical considerations, not fundamental ones. As discussed before and demonstrated in FIGS. 4A-4H, the angular range of emission for a thermal metasurface is related to the Q-factor and the band curvature. Increasing the Q-factor and sharpness of the band increases the distance the q-BIC travels in-plane before scattering, and therefore it increases the spatial coherence and effective aperture size, which narrows the angular range of emission. For an azimuthally wrapped phase gradient, narrowing the angular range emitted at each location along the device will increase the OAM purity. However, the energy contained in the q-BIC must be localized within the bounds of the device, or it simply escapes in-plane and it does not contribute to the emission. Therefore, a compact device requires a flat band and low Q-factor, which limits the OAM purity. Since a compact device is a practical requirement for the numerical demonstration by full wave simulations, the result has somewhat limited purity. However, an experimental platform aiming at high purity OAM may largely improve on this result by increasing the size of the device, increasing the Q-factor, and employing a q-BIC with a sharper band. A q-BIC with an isotropic angular dispersion is also desirable. Despite these limitations, net OAM and pure SAM are generated by the thermal metasurface platform constructed out of purely rational design principles. Computational approaches, such as inverse design, may be employed to further optimize the performance of this, as well as the previous designs. Thermal metasurfaces are therefore considered to be a uniquely promising platform for ultra-compact thermal light generation with arbitrary SAM and OAM.

FIGS. 6H to 6K demonstrate control of micron-scale light in a monolithic fabrication scheme achievable with standard procedures that require only a single patterning step. Here, all pillars are coplanar with the same height, fashioned by reactive ion etching of an amorphous silicon thin film with a hard mask defined by electron beam lithography. The pillars sit atop a thin film of silicon dioxide, which sits atop a thin film of gold. Compared to designs comprised of pillars are two distinct planes, this design simplifies experimental demonstration but also requires more careful design to achieve the desired response. Making use of destructive interference at the operating wavelength, the thickness of the silicon dioxide thin film is chosen to minimize the effect of optical scattering due to the interface between the silicon pillars and silicon dioxide. This confers dominance in the optical scattering to the top interface of the silicon pillars, which in turn promotes chirality in the optical response for suitably designed pillars. The pillars are designed to preferentially emit circularly polarized light at the operating wavelength. The dimer elements, or pillars 102 and 103, are appropriately displaced in the plane compared to the birefringent elements, or pillars 101, in order to avoid intersection but still in keeping with the symmetry requirements of the selection rules rules (A. C. Overvig, S. C. Malek, M. J. Carter, S. Shrestha, and N. Yu, "Selection rules for quasi-bound states in the continuum", Phys. Rev. B 102, 035434 (2020)). In comparison to the outline in FIG. 1B, the pillars 102 and 103 are displaced relative to the pillars 101 by a distance P/2 in the x direction (the direction as defined in FIG. 1A). The pillars 102 and 103 are chosen to have rectangular cross section for ease of fabrication. The pillars are arranged across the surface with varying in-plane orientation angles such that the emitted light radiates to circularly polarized light, but preferentially to a designed angle that is different from the surface normal.

Figure 6H:
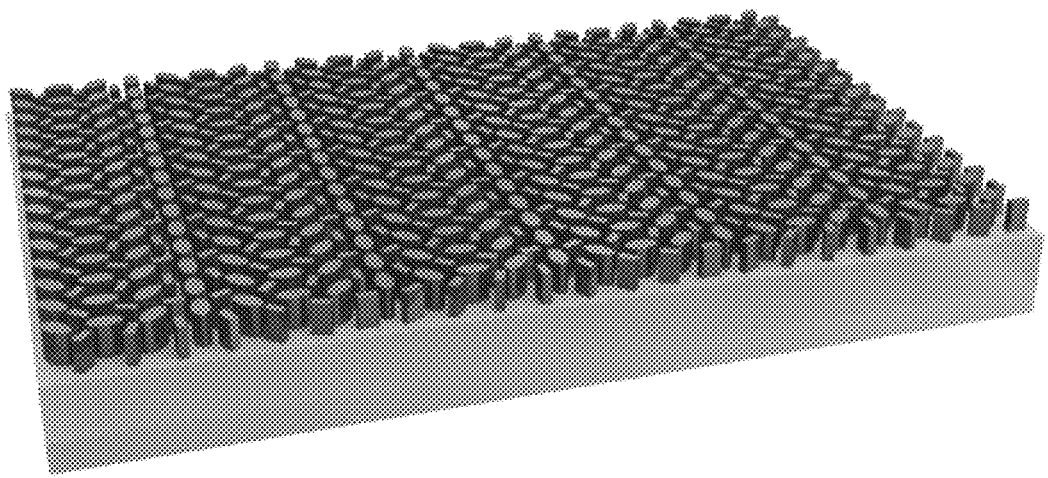
FIG. 6H depicts a thermal metasurface targeting thermal emission at 4 micron wavelength of light.
Figure 6I:
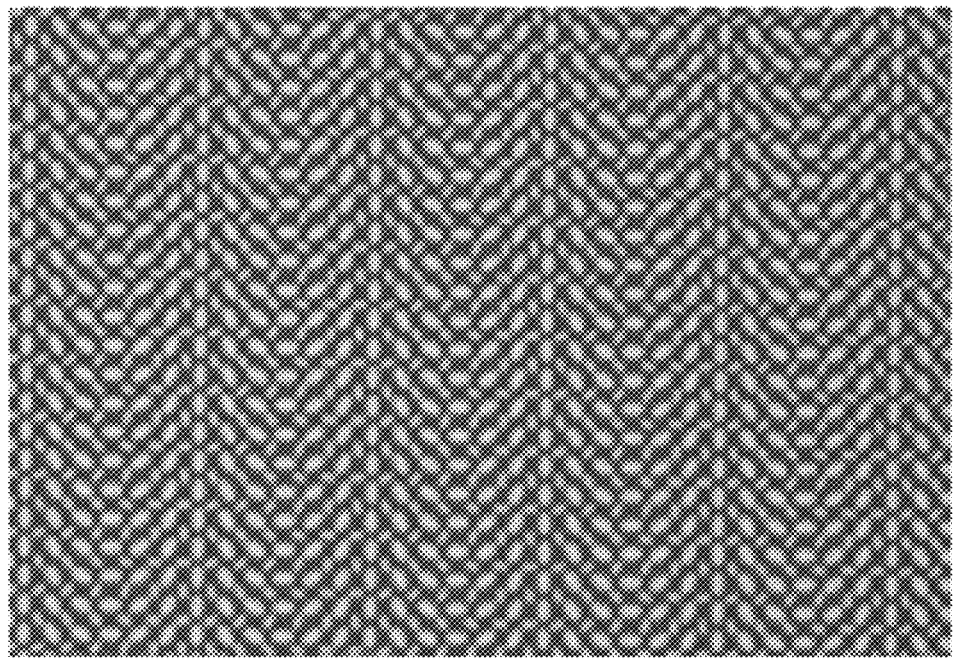
FIG. 6I depicts an optical micrograph of an experimentally fabricated sample that preferentially emits right hand circularly polarized (RCP) light to an angle that differs from the surface normal by a desired amount.
Figures 6J, 6K:
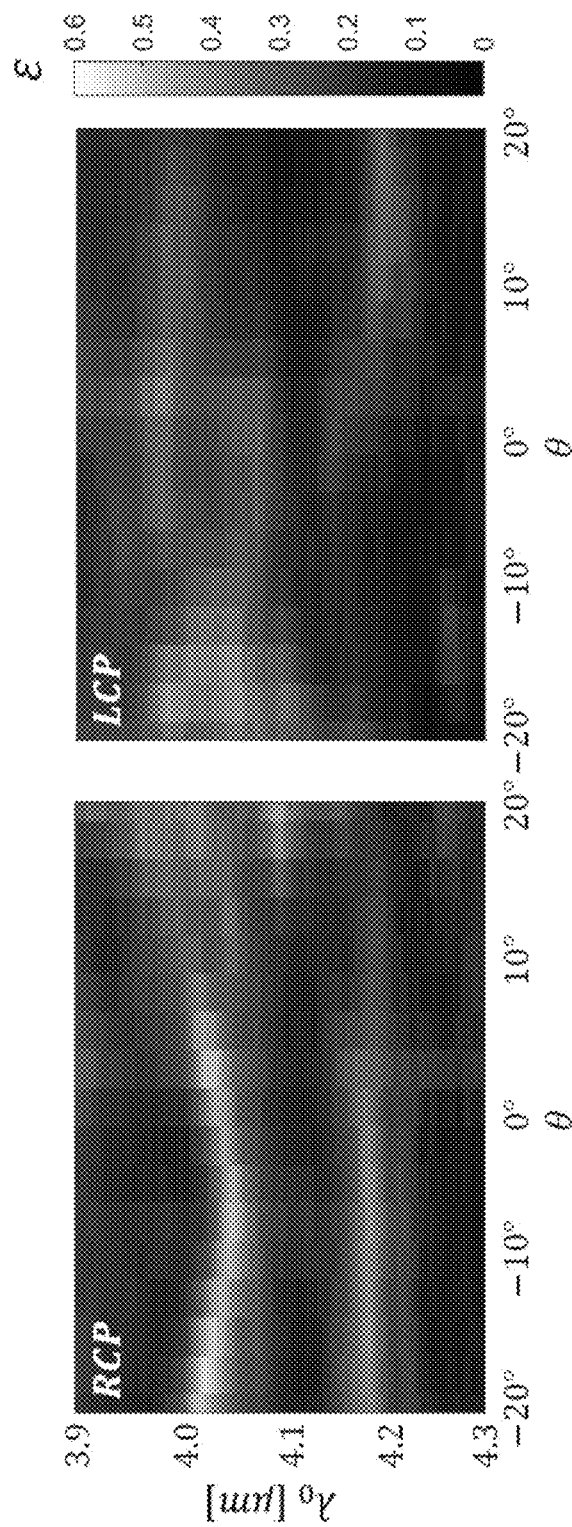
FIG. 6J shows an angle-resolved and spectrum-resolved emission for right hand circularly polarized (RCP) light near the operating wavelength of 4.05 microns. The sample is heated to a temperature of 300 degrees C.
FIG. 6K shows an angle-resolved and spectrum-resolved emission for left hand circularly polarized (LCP) light near the operating wavelength of 4.05 microns. The sample is heated to a temperature of 300 degrees C.

FIG. 6H depicts a thermal metasurface for 4 micron light. The thermal metasurface comprises silicon, silicon dioxide and gold. The patterned silicon layer is 1490 nm thick, the silicon dioxide layer is 2640 nm, and the gold layer is at least 100 nm thick (here, roughly 150 nm). The metasurface may sit on a substrate of any material; here it sits on a substrate of silicon. The pillars 101 have elliptical cross section with major diameter $L_m=1479$ nm, minor diameter $W_m=796$ nm, and height $H_m=1490$ nm. The pillars 102 and 103 have rectangular cross sections with dimensions $L_d=90$ nm, $W_m=425$ nm, and height $H_m=1490$ nm. The dielectric film 104 is omitted in this design (see FIG. 1F). FIG. 6I depicts an optical micrograph of an experimentally fabricated sample that preferentially emits right hand circularly polarized (RCP) light to an angle that differs from the surface normal by a desired amount. FIG. 6J shows an angle-resolved and spectrum-resolved emission for right hand circularly polarized (RCP) light near the operating wavelength of 4.05 microns. The sample is heated to a temperature of 300 degrees C. FIG. 6K shows an angle-resolved and spectrum-resolved emission for left hand circularly polarized (LCP) light near the operating wavelength of 4.05 microns. The sample is heated to a temperature of 300 degrees C.

TABLE 1

Complete control of thermal emission

| Property | TCMT parameters | Control mechanism | Metasurface parameters |
|---|---|---|---|
| A | $\sqrt{1-|r|^2}$, $\gamma_i$ | Critical coupling | $W_d$, $L_d$, $\kappa$ |
| $\Phi$ | $\Phi_c$ | Local scattering | $W_m$, $L_m$, $\theta$ |
| $\chi$ | $\beta = \theta - \phi$ | Chiral perturbation + local birefringence | $W_m$, $L_m$, $\theta$, $\alpha$ |
| $\psi$ | $\theta$ | Chiral perturbation + local birefringence | $W_m$, $L_m$, $\theta$, $\alpha$ |
| $\tau_c$ | $\tau = 1/\gamma_r$ | Perturbation | $W_d$, $L_d$ |
| $L_c$ | $\sqrt{b\tau}$ | Perturbation + band curvature | $W_d$, $L_d$, b |
| p | N/A | Multiplexing | N/A |

Background: Partially Coherent Wavefront Parameterization

Figures 7A, 7B:
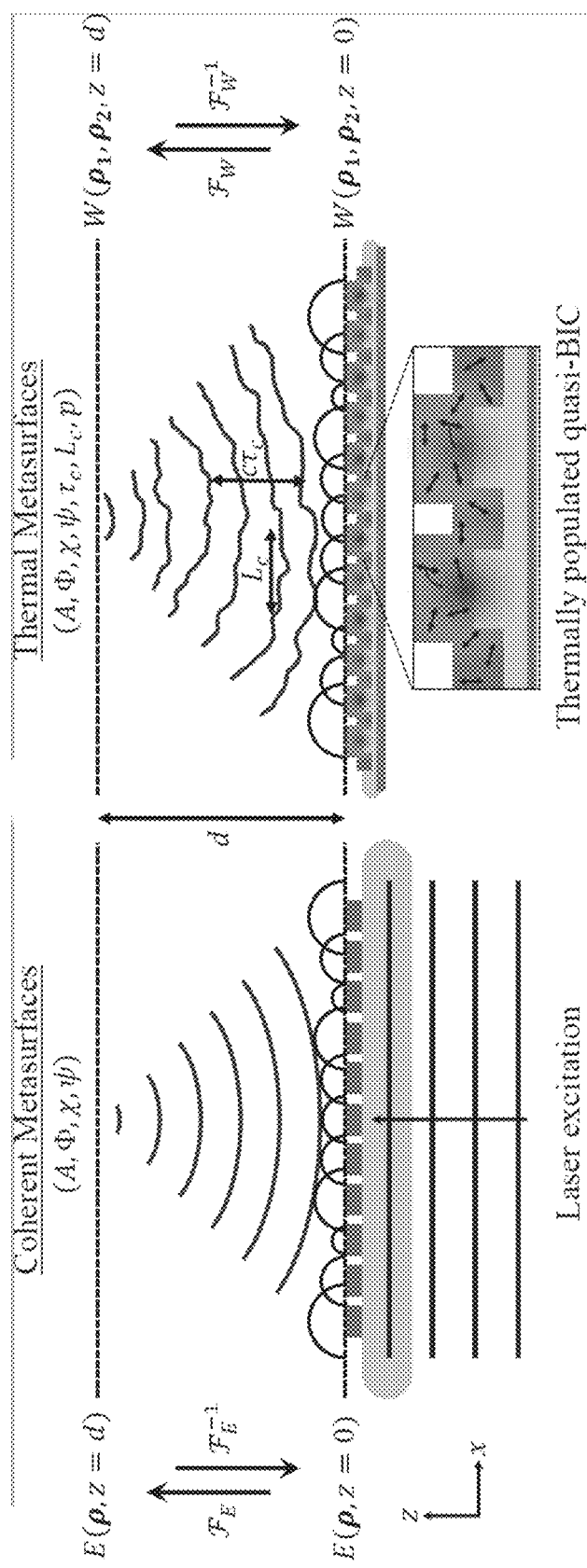
FIG. 7A is a schematic of a coherent metasurface transforming an incident waveform into the desired waveform by spatially varying the scattering along the surface, visualized as Huygens' wavelets. Each wavelet is characterized by a combination of amplitude, phase and polarization state, which in concert produce the desired far-field profile. The coherence of the system implies that the mapping from metasurface to far-field is invertible.
FIG. 7B is a schematic of a thermal metasurface composed of a patterned structure over a ground plane supporting a thermally populated global mode whose out-of-plane scattering is locally tailored to produce a partially coherent waveform of choice.

To shape the discussion and clarify what a thermal metasurface can in principle be capable of, the parameters characterizing its generated wavefront are first defined. For this purpose, the coherent wavefronts engineered by conventional metasurfaces are compared to the partially coherent wavefronts generated by thermal metasurfaces. As depicted in FIG. 7A, conventional metasurfaces are excited by an external coherent source (e.g., from a laser), locally scattering the impinging light at the metasurface plane (z=0) in order to control the optical wavefront at a parallel plane of interest (z=d). Guided by the Huygens-Fresnel principle, a coherent metasurface locally tailors the amplitude A, phase $\Phi$ and polarization response, characterized by the ellipticity parameters $\psi$ and $\chi$. This is typically achieved using a pre-computed library of unit cell geometries, where nearest neighbor interactions are ignored, implying a strictly local response. For a scalar wavefront, i.e., $\psi$ and $\chi$ fixed across the device, the field along the metasurface $E(\rho, z=0)$ produces a field $E(\rho, z=d)$ at a parallel plane according to:

$$E(\rho, z=d) = \int d\rho' E(\rho', z=0) \exp(ik_0|\rho-\rho'|)/|\rho-\rho'|, \quad (11)$$

where the frequency dependence is left implicit and use the spatial coordinates $r=(\rho, z)$ with $\rho=(x, y)$. Ignoring the nonradiative (near field) field components, the relationship between $E(\rho, z=0)$ and $E(\rho, z=d)$ is invertible as $$E(\rho, z=0) = \int d\rho' E(\rho', z=d) \exp(-ik_0|\rho-\rho'|)/|\rho-\rho'|, \quad (12)$$

implying that one may specify the output field of the metasurface required to generate the desired field in the far-field. This mapping of electric fields is schematically sketched in FIG. 7A by the side arrows, and denoted with $F_E$ for the forward mapping and with $F_E^{-1}$ for the inverted mapping, consistent with the foundations of holographic techniques. For these local metasurfaces, the field exiting the metasurface is simply given by $$E(\rho, z=0) = \tau(\rho) E_{in}(\rho, z=0), \quad (13)$$

which, together with Eq. (12), specifies the required local amplitude and phase response of the metasurface $\tau(\rho)$. This description can be straightforwardly extended to a vectorial form, enabling complete point-by-point control of the outgoing values of A, $\Phi$, $\psi$, and $\chi$.

In contrast, a thermal metasurface produces a partially coherent wavefront parameterized by more degrees of freedom than a coherent one. The wavefront is generated indirectly, mediated by a thermally populated q-BIC that correlates optical energy across the surface before scattering to the far field FIG. 7B. In general, the wavefront emanating from the metasurface is characterized not only by A, $\Phi$, $\psi$, and $\chi$, but also by its temporal coherence $\tau_c$, spatial coherence length $L_c$ and degree of polarization p. Notably, the phase is only locally physical: partially coherent wavefronts are statistically described by ensemble averages that destroy the phase information over sufficiently large time periods and distances. Within the coherence volume of the wave, however, the phase is necessary to describe the optical wavefront, e.g., the local phase front still describes the direction of the optical energy flow. In particular, for scalar wavefronts a partially coherent wave is described by the cross-spectral density.

$$W(\rho_1, \rho_2, z) = \langle E^*(\rho_1, z) E(\rho_2, z) \rangle \quad (14)$$

where the angled brackets denote an appropriate time average or ensemble average, which is characterized by the coherence properties of the wavefront. The cross-spectral density at the metasurface plane $W(\rho_1, \rho_2, z=0)$ produces a field $W(\rho_1, \rho_2, z=d)$ at a parallel plane according to $$W(\rho_1, \rho_2, d) = \int\int d\rho_1' d\rho_2' G^*(\rho_1 - \rho_1', d) G(\rho_2 - \rho_2', d) W(\rho_1', \rho_2', 0), \quad (15)$$

where $$G(\rho - \rho', d) = \exp\left(i\frac{\omega}{c}\sqrt{|\rho-\rho'|^2 + d^2}\right) / \sqrt{|\rho-\rho'|^2 + d^2}. \quad (16)$$

Again ignoring the near-field components, the relationship between $W(\rho_1, \rho_2, 0)$ and $W(\rho_1, \rho_2, d)$ is invertible to $$W(\rho_1,\rho_2,0) = \int\int d\rho_1' d\rho_2' G(\rho_1-\rho_1',d) G''(\rho_2-\rho_2',d) W(\rho_1', \rho_2', d), \quad (17)$$

meaning that one may compute the required output cross-spectral density of the thermal metasurface in order to generate a desired far field. This mapping is denoted $F_W$ and the inverted mapping $F_W^{-1}$ in FIG. 7B, and it may be seen as the extension of holography to partially coherent waves.

A key property of the cross-spectral density is the information that it contains about the field coherence. In the space-frequency domain, this information is encapsulated within the spectral degree of coherence $$\mu(r_1, r_2, \omega) = \frac{W(r_1, r_2, \omega)}{\sqrt{W(r_1, r_1, \omega)}\sqrt{W(r_2, r_2, \omega)}}, \quad (18)$$

which is a complex quantity whose magnitude varies between 0 (completely incoherent) and 1 (completely coherent). The frequency dependence has been explicitly added to emphasize that this quantity is defined in the space-frequency domain. Finally, for vector fields the cross-spectral density is replaced by the electric cross-spectral density $$W = \begin{bmatrix} W_{xx} & W_{xy} \\ W_{yx} & W_{yy} \end{bmatrix}, \quad (19)$$

where $$W_{ij}(\rho_1, \rho_2, \omega) = \langle E_i^*(\rho_1, \omega) E_j(\rho_2, \omega) \rangle, \quad (20)$$

which contains the information about the degree of polarization, $$p(r, \omega) = \sqrt{1 - \frac{4 \operatorname{Det}\,[W(r, r, \omega)]}{(Tr[W(r, r, \omega)])^2}}. \quad (21)$$

Coherent Thermal Emission with q-BICs

In order to gain control over thermal emission from a structured material mediated by a long lifetime mode, command of both its radiative and nonradiative lifetimes is desired. A dual perturbative approach for this purpose is disclosed: beginning with a high symmetry photonic crystal slab in a lossless materials system (FIG. 8A), it is altered with both a geometric and a material perturbation (FIG. 8B). The geometric perturbation, quantified by $\delta$, controls the radiative lifetime of a q-BIC supported by the structure, while the material perturbation, quantified by $\kappa$, introduces an imaginary part of the refractive index controlling the nonradiative lifetime. Then, by operating at the band-edge frequency, light emits into a small solid angle near normal incidence, with angular spread $\Delta k$. In this way, one can simultaneously tune the lifetime and peak emissivity of a q-BIC supported by the thermal metasurface. While the lifetime directly controls temporal coherence of the emitted light, the angular spread $\Delta k$ determines and controls its spatial coherence. Numerical results are produced by full-wave simulations using the finite difference time domain method (Lumerical Solutions). The absorption properties of the devices are studied under various illumination conditions, and the emission features are then retrieved due to the relations between absorptivity and emissivity.

Controlling Coherent Emission with Thermally Populated q-BICs

While the approach presented in the following is quite general, for concreteness the perturbations imparted to the otherwise symmetric structure are envisioned to be a dimerization of a square lattice of doped silicon pillars (refractive index n=3.45 when undoped) in air. As shown in FIG. 8B, the circular pillars are distorted into two ellipses oriented 90° from one another with major and minor diameters differing by $\delta$, and silicon is altered by the introduction of dopants, perturbing the refractive index of the silicon by a value $\Delta n + ik$. For generality and simplicity, throughout this work these material parameters are taken to be dispersionless, but the monochromaticity may be improved by selecting a dopant with a narrowband absorption profile, such as Erbium dopant atoms implanted into silicon for near-infrared wavelength operation. The dimerization creates and governs the radiative properties of the q-BIC, while the imaginary part of the refractive index allows thermal population of the q-BIC in the near-field. In particular, the q-BIC has a radiative Q-factor following $Q_r = \omega_0/2\gamma_r \propto 1/\delta^2$ (FIG. 8C) and a nonradiative Q-factor following $Q_i = \omega_0/2\gamma_i \propto 1/k$ (FIG. 8D), where $\omega_0$ is the resonant frequency, $\gamma_r$ is the radiative decay rate of the mode, and $\gamma_i$ is the nonradiative decay rate. The dependence of the radiative Q-factor on $\delta$ is well-established for q-BICs, and the expression of the nonradiative Q-factor as a function of k may be derived based on a perturbative analysis (see Appendix B in U.S. Patent application 63/192,292).

Figures 8A, 8C, 8E:
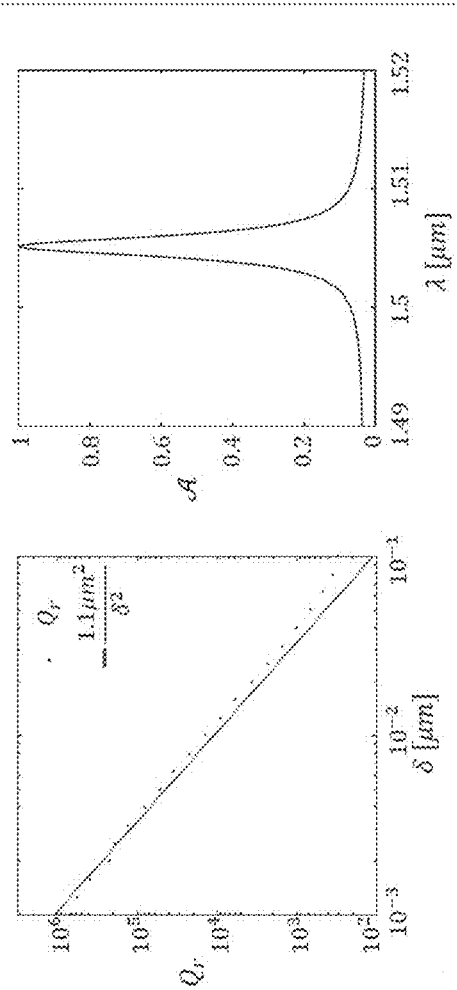
FIG. 8A shows an unperturbed high-symmetry lattice of a lossless material with index n.
FIG. 8C is a graph show the radiative Q-factor (for fixed k) varies as $Q_r \propto 1/\delta^2$.
FIG. 8E is a graph showing an absorption spectrum of the q-BIC near the resonant frequency for normal incidence and x polarized light.
Figures 8B, 8D, 8F:
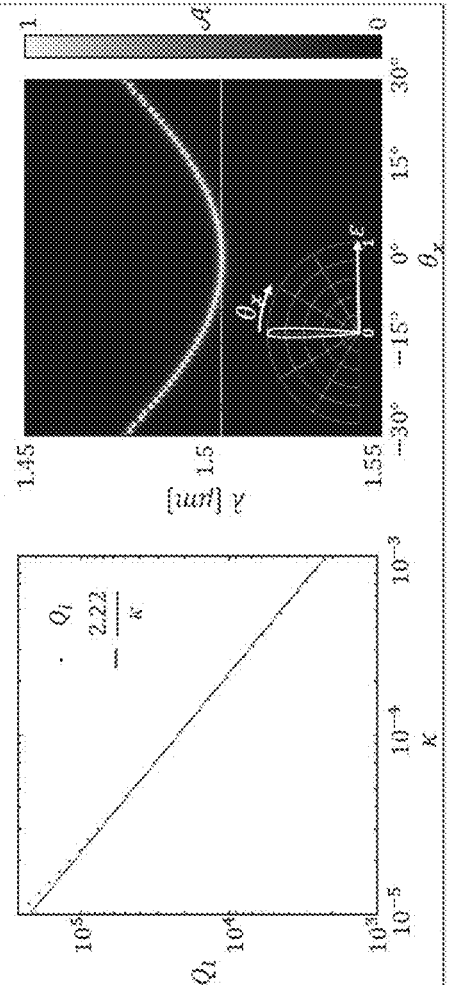
FIG. 8B shows a perturbed asymmetrical material that is perturbed both geometrically (with asymmetry parameter δ) and in index (adding a small extinction coefficient κ).
FIG. 8D is a graph showing the non-radiative Q-factor (for fixed δ) varies as $Q_i \propto 1/k$.
FIG. 8F shows an absorption spectra for a range of incidence angles, showing perfect absorption following a parabolic angular dispersion. The band-edge mode (dashed white line) emits to a narrow range of angles near the normal (inset). Note: the three-dimensional structure used to calculate

When $\delta$ and $\kappa$ are properly tuned to achieve critical coupling, x polarized light at normal incidence is perfectly absorbed at the resonant frequency, which produces a Fano lineshape FIG. 8E corresponding to a sharp thermal emission feature. Off normal incidence, similar absorption/emission spectra can be observed, but with a resonant frequency shift following the angular dispersion of the q-BIC, shown in FIG. 8F. Due to reciprocity, this band diagram is necessarily symmetric, implying that at all frequencies are absorbed symmetrically for opposite incidence angles. In other words, for every eigenfrequency $\omega_i(k)$ a second eigenfrequency $\omega_i(-k) = \omega_i(k)$ is found. This symmetry in the modal structure appears to suggest that unidirectional emission to an arbitrary angle, without emitting to the reciprocal one, is impossible. However, by tailoring the far-field coupling at $\omega_i(k)$ and $\omega_i(-k)$ it is possible to realize unidirectional emission at an arbitrary angle in completely reciprocal systems. At the band-edge these two angles converge to a single one at normal incidence, in which case thermal emission occurs unidirectionally along the surface normal (inset of FIG. 8F).

Taken as a whole, the results in FIGS. 8A-8F imply that double perturbation allows independent control over radiative and nonradiative lifetimes, enabling the construction of a library of perturbations as one independently vary $\delta$ and $\kappa$ at the basis of the design of thermal metasurfaces. Such a library, along with possible implementations and alternatives, is discussed further in Appendix C of U.S. Patent application 63/192,292, where $Q_r$ varies according to the geometric perturbation and $Q_1$ according to the dopant concentration. Based on temporal coupled mode theory (TCMT), a Fano resonance with radiative Q-factor $Q_r$ and non-radiative Q-factor $Q_1$ has an overall Q-factor $$Q_0 = \frac{Q_r Q_l}{Q_r + Q_l}. \quad (22)$$

Meanwhile, the absorption A at resonance follows.

$$A = \varepsilon = \frac{4 Q_r Q_l}{(Q_r + Q_l)^2}, \quad (23)$$

where, by Kirchhoff's law of thermal radiation, it is equated to the thermal emissivity c. Hence, a thermal metasurface with simultaneously controllable radiative and nonradiative lifetimes has command over its linewidth and peak emissivity. The control shown in FIGS. 8A-8F therefore represents the first step to constructing a metasurface that thermally emits light in a spatially tailorable manner.

Temporal and Spatial Coherence of a Thermally Populated q-BIC

The following relates the optical lifetime and angular dispersion near the band-edge to the temporal and spatial coherence of light emitted by a thermally populated q-BIC. The temporal coherence is determined by its optical lifetime, i.e., its linewidth. The spatial coherence depends on the near field of the thermal source, in the case corresponding to a characteristic distance over which the q-BIC energy propagates laterally in-plane before scattering out to the far field; it therefore also depends on the optical lifetime of the mode. Nevertheless, it additionally depends on the shape of the band structure, and so it may be independently controlled by band structure engineering. In the following, an analytical expression is derived for the spectral degree of coherence based on TCMT, yielding a simple route to control the spatial coherence of a q-BIC based thermal metasurface.

Figure 9A:
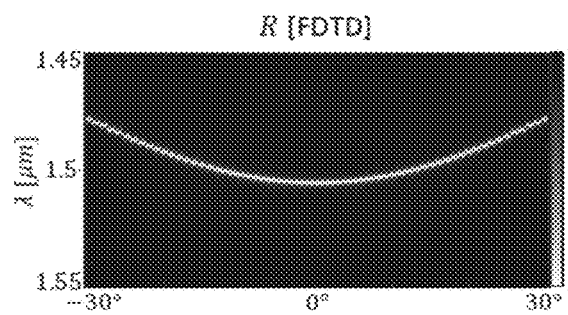
FIG. 9A and FIG. 9B show reflectance for x polarized light near a critically coupled q-BIC calculated based on FDTD (FIG. 9A, reproduced from FIG. 8D) and TCMT.
Figure 9B:
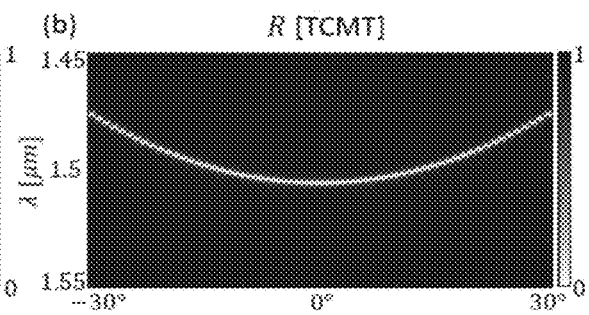
Figure 9C:
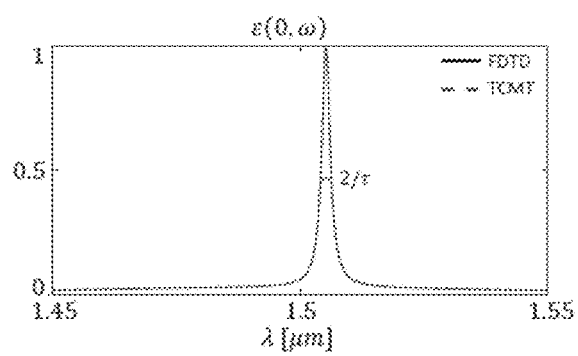
FIG. 9C shows emissivity at normal incidence, with linewidth inversely related to the temporal coherence.
Figure 9D:
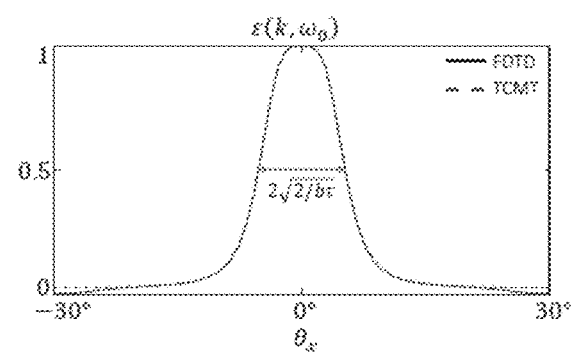
FIG. 9D shows emissivity profile at the band-edge frequency, with angular width given by the spatial coherence.

The metasurface are assumed to support a spectral response analogous to FIG. 8D for x polarized light. Following the derivation detailed in Appendix A of U.S. Patent application 63/192,292 for a more general scenario, it can be shown that the reflection coefficient for such a linearly polarized q-BIC satisfying $\gamma_r = \gamma_i$ is $$r(k,\omega)) = r_c(\omega) + \frac{i}{(\omega - \omega_{res}(k))/\gamma_r - i}, \quad (24)$$

where $r_c(\omega)$ is a local background scattering coefficient, i.e., due to a Fabry-Perot resonance, slowly varying compared to the resonance features, and $\omega_{res}(k)$ is the angularly dispersive resonant frequency. Within the frequency range of interest, the local background may be simply approximated by a sinusoidally varying function of $\omega$ $$r_c(\omega) = r_0 - (1 - r_0)\cos\left(\frac{2\pi}{P_\omega}(\omega - \omega_1)\right), \quad (25)$$

where $r_0$ is a real valued, near-unity coefficient, $P_\omega$ determines the spectral period of the thin film resonances, and $\omega_1$ is a frequency with peak local absorption. The dispersion may be approximated by a Taylor expansion about k=0

$$\omega_{res}(k) \approx \omega_0 + \frac{b}{2}k^2, \quad (26)$$

where the coefficient b is a quantitative measure of the band curvature near the band-edge mode. Finally, the absorption is simply $A(k, \omega)=1-|r(k, \omega)|^2$. By Kirchhoff's law of thermal radiation, the TCMT model for absorption directly provides an analytical form for the thermal emissivity in momentum-frequency space $\varepsilon(k, \omega)=1-R(k, \omega)$, where the reflectance $R(k, \omega)=|r(k, \omega)|^2$. To validate this model, FIG. 9A and FIG. 9B show excellent agreement between the spectra calculated by FDTD and this model with appropriately fit values (FIG. 9A reproduces FIG. 8D for comparison]. FIG. 9C shows the agreement between FDTD and TCMT spectra for light emitted at $\theta_x=0$, and FIG. 9D shows the angular profile for light emitted at the band-edge mode. Due to the Wiener-Khinchin theorem, the linewidth of emission, shown in FIG. 9C, related to the lifetime of the mode $\tau$, directly determines the temporal coherence of the emitted light, namely $$\tau_c = \tau = 1/\gamma_r. \quad (27)$$

The fit value $r_0=0.9935$, stemming from the calculations, suggests that, despite the homogeneous material loss in silicon considered in the simulations but neglected in the TCMT model, the broadband, local material loss has negligible effects on this operation. The q-BIC enhanced optical lifetime dominates the spectral features: the q-BIC is critically coupled when a very low value of loss is present ($\kappa=10^{-2.84}$), which introduces little absorption for non-resonant light. Hence, just as in the case of luminescence, the emitted spectrum may be significantly narrowed and the background (unpatterned) emission correspondingly suppressed. This feature improves as the Q-factor increases, at the expense of higher sensitivity to design or fabrication errors.

Analogously to the relationship between spectral width and temporal coherence, the angular width of emission, shown in FIG. 9D, determines the spatial coherence. For simplicity in highlighting the physics of the nonlocal component of the scattering, the local scattering is assumed to be lossless, i.e., $r_0=1$, giving the relation $$\varepsilon(k,\omega) = \frac{1}{1 + \tau^2\left(\omega - \omega_0 - \frac{b}{2}k^2\right)^2}. \quad (28)$$

Figure 9E:
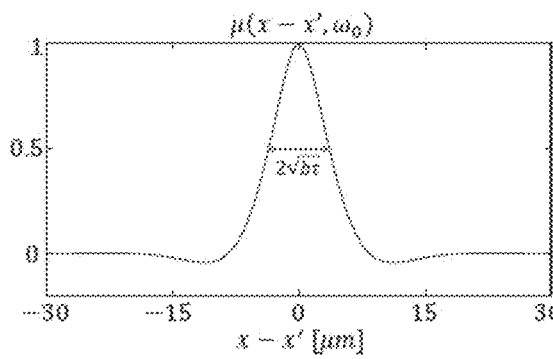
FIG. 9E shows spectral degree of coherence at the band-edge frequency, with linewidth characterizing the spatial coherence of the emission.

With an analytical form of the optical response in hand, a closed form expression for the spatial coherence length $L_c$ is derviced. As detailed in Appendix D of U.S. Patent application 63/192,292, the relation below is produced:

$$\mu(x,\omega) = \frac{1}{\text{Im}\,[\xi(\omega)]}\,\text{Im}\!\left[\xi(\omega)\exp\!\left(-\frac{|x|}{\xi(\omega)}\right)\right], \quad (29)$$

where $$\xi(\omega) = \sqrt{\frac{b\tau/2}{i - (\omega - \omega_0)\tau}} \quad (30)$$

is a complex quantity with units of length that characterizes the spatial nonlocality of the response at each frequency. In particular, at the band-edge $\xi(\omega_0)=\sqrt{b\tau/2i}$, and the form of $\mu(x, \omega)$ is shown in FIG. 9E for this scenario. The magnitude of Eq. (29) is half of its maximum at a displacement of approximately $x \approx \sqrt{b\tau}$ (more precisely, its value at $x=\sqrt{b\tau}$ is $[\cos(1)+\sin(1)]/e \approx 0.508$). The coherence length of such a thermal metasurface at the band-edge frequency is therefore $$L_c \approx \sqrt{b\tau}. \quad (31)$$

It follows that the spatial coherence of the band-edge mode is determined both by the band curvature and by the linewidth of the resonance. Appendix E of U.S. Patent application 63/192,292 arrives at the same expression for the coherence length for a parabolic band structure by starting from the electric field expression, rather than from a CMT description.

Figure 9F:
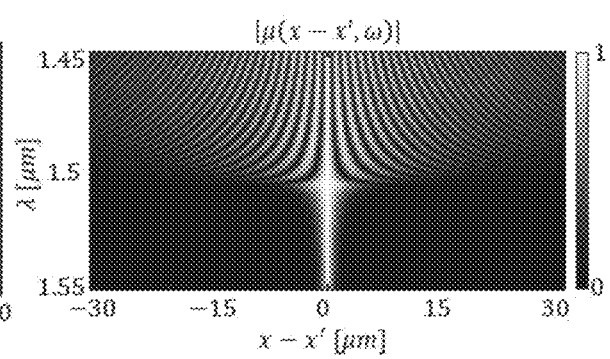
FIG. 9F shows magnitude of the spectral degree of coherence mapped in the space-frequency domain.

FIG. 9F visualizes $\mu(x, \omega)$ in the space-frequency domain, showing little spatial coherence below the band-edge, and larger spatial coherence at and above the band-edge. Note that this example has a remarkably flat band structure (b is small), meaning that light at the band-edge remains substantially localized due to Bragg reflection, and the spatial coherence is modest. Above the band-edge, and for bands with significantly larger values of b, the spatial coherence may be much larger. Therefore, the results here suggest that band structure engineering can control to a large extent the degree of lateral localization for a given optical lifetime, while the optical lifetime itself determines the temporal coherence. The in-plane localization afforded by such a flat band structure enables computationally tractable full-wave simulations of compact aperiodic 3D structures at the expense of spatial coherence; applications requiring higher degrees of spatial coherence should use a q-BIC with sharper bands, i.e., a larger value of b, than the one investigated in FIGS. 9A-9F.

Constraints on Spatial Tailoring of Thermal Wavefronts

While the dual perturbation discussed elsewhere in this specification can tailor the spatial and temporal coherence of thermal emission with simultaneous control of A, $\tau_c$ and $L_c$, a thermal metasurface must be able to simultaneously control also the local phase and polarization state parameters of the emitted light, $\Phi$, $\chi$, $\psi$ and p in a spatially varying manner. Such command over thermal emission would enable locally shaped wavefronts with arbitrary polarization. In this section, fundamental constraints on such a spatially varying thermal metasurface stemming from time reversal symmetry and reciprocity are outlined. In particular, the constraints on thermal metasurfaces placed over a ground plane are discussed, a configuration that enables maximum unidirectional emissivity without complex and sensitive overlap of more than one narrowband resonance. One key finding is that a thermal metasurface placed over a mirror and employing a single q-BIC must simultaneously control both local and nonlocal properties of the scattering process, requiring a hybrid approach combining conventional (local) metasurface designs with judicious use of the selection rules governing nonlocal responses.

Constraints within Temporal Coupled Mode Theory

To assess the constraints on the scattering of a thermally populated q-BIC, a TCMT is employed to describe the interference between the background (local) scattering process with scattering matrix c and a (nonlocal) q-BIC coupled to an external incident state with Jones vector $$|s_+\rangle = \begin{bmatrix} s_x \\ s_y \end{bmatrix}, \quad (32)$$

where $s_{x,y}$ may generally be complex, and are normalized such that the inner product $\langle s_+|s_+\rangle$ the incident intensity. The incident radiation excites a q-BIC with resonant frequency $\omega_0$, radiative and nonradiative decay rates $\gamma_r$ and $\gamma_i$ according to the equation of motion $$\frac{da}{dt} = (i\omega_0 - \gamma_r - \gamma_i)a + \langle k^*|s_-\rangle, \quad (33)$$

where a is the complex amplitude of the q-BIC resonance, normalized so that $|a|^2$ is the stored energy per unit area. The coupling vector $|k\rangle$ indicates how the resonance couples to incident radiation. The reflected wave $|s_-\rangle$ is given by $$|s_-\rangle = C|s_+\rangle + |d\rangle a, \quad (34)$$

where $|d\rangle$ is the coupling vector governing how the resonance decays into the output port. The coefficients in Eqs. (33) and (34) are subject to a number of constraints. For example, reciprocity requires that $$|k\rangle = |d\rangle, \quad (35)$$

from conservation of energy:

$$\langle d|d\rangle = \frac{2}{\tau}, \quad (36)$$

and combined with Eq. (35) time reversal invariance dictates that $$C|d^*\rangle = -|d\rangle. \quad (37)$$

Using these constraints, the relation $C=C^T$ dictated by reciprocity, and Eqs. (33) and (34), the scattering matrix $|s_-\rangle = S|s_+\rangle$ can be written as $$S = C + \frac{|d\rangle\langle d^*|}{i - (\omega - \omega_0) + \gamma_r + \gamma_i}. \quad (38)$$

The scattering matrix as a whole also satisfies the reciprocity condition $$S = S^T. \quad (39)$$

At the resonant frequency, absorption is unity (and hence thermal emission maximized) only when the system satisfies the critical coupling condition $\gamma_r = \gamma_i$. Detuning from this condition enables control over the emitted amplitude, as seen in Appendix C of U.S. Patent application 63/192,292. Indeed, the radiative and nonradiative Q-factors described elsewhere in this specification are related according to $Q_r = \omega_0/2\gamma_r$ and $Q_i = \omega_0/2\gamma_i$, and therefore these phenomenological parameters within the TCMT are described by parameters that a thermal metasurface may directly control. As shown in the following sections, a thermal metasurface can indeed directly control every phenomenological parameter present in Eq. (38).

The time-reversal constraint in Eq. (37) shows that the scattering of a q-BIC to the far field (generally a nonlocal phenomenon) is not independent from the local scattering. Indeed, both the polarization state as well as the phase of the emitted state are constrained by the local scattering c. For instance, taking the local scattering to be the one of a perfect mirror $$C = \exp(i\Phi_C)\begin{bmatrix} -1 & 0 \\ 0 & -1 \end{bmatrix}, \quad (40)$$

where $\Phi_C$ is a reference phase, upon applying Eq. (37) the emitted state must satisfy $$\exp(i\Phi_C)d^*_{x,y} = d_{x,y}, \quad (41)$$

i.e., the phase of the emitted state is real-valued but for the factor $\Phi_C$. Or, more generally, the emitted phase, $\Phi = \angle d_{x,y}$, is $$\Phi = \Phi_C/2. \quad (42)$$

This result has several consequences: first, it implies that, for the emitted state to have an arbitrary polarization state, the local scattering must be birefringent to break the condition $\angle d_x = \angle d_y$. Minimal local absorption is generally desired, since thermal emission across narrow bandwidths around the Fano resonance is targeted, meaning that the local scattering may not have any dichroism; the local birefringence is the only parameter that may lift the polarization state from the equator of the Poincaré sphere, where $\angle d_x = \angle d_y$. For instance, to achieve pure circularly polarized emitted light, the direct scattering matrix must behave as a halfwave plate:

$$C = \exp(i\Phi_C)\begin{bmatrix} -1 & 0 \\ 0 & 1 \end{bmatrix}, \quad (43)$$

and so, by Eq. (37), the emitted state must follow $$\exp(i\Phi_C)d^*_x = d_x$$

$$\exp(i\Phi_C)d^*_y = -d_y$$

allowing $\angle d_x = \Phi_C/2$ and $\angle d_y = (\Phi_C \pm \pi)/2$, corresponding to a circularly polarized state at a pole of the Poincaré sphere, where $\angle d_x - \angle d_y = \mp \pi/2$.

The second consequence of Eq. (42) is that the phase of the emitted state is directly controlled by the local scattering phase, i.e., the emitted phase is half the phase that would be imparted by the local component of the metasurface if the q-BIC were absent. Overall, this time reversal constraint shows that a thermal metasurface based on a q-BIC must vary the local scattering properties; for complete control of the thermally emitted light, it is not sufficient to vary the perturbation according to the selection rules as done in recent nonlocal metasurfaces showing spatial control of Fano resonances and even wavefront-selective Fano resonance.

Visualization of the Constraints with Schematic Scattering Matrices

Figure 10D:
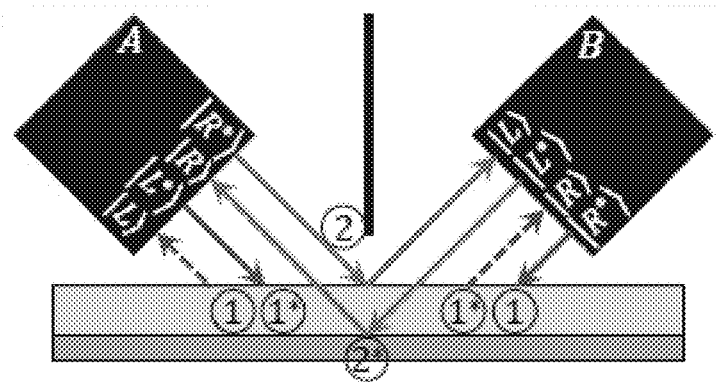
FIG. 10D depicts schematic showing two black bodies, A and B, exchanging energy through a locally specular mirror with a nonlocal q-BIC.
Figure 10E:
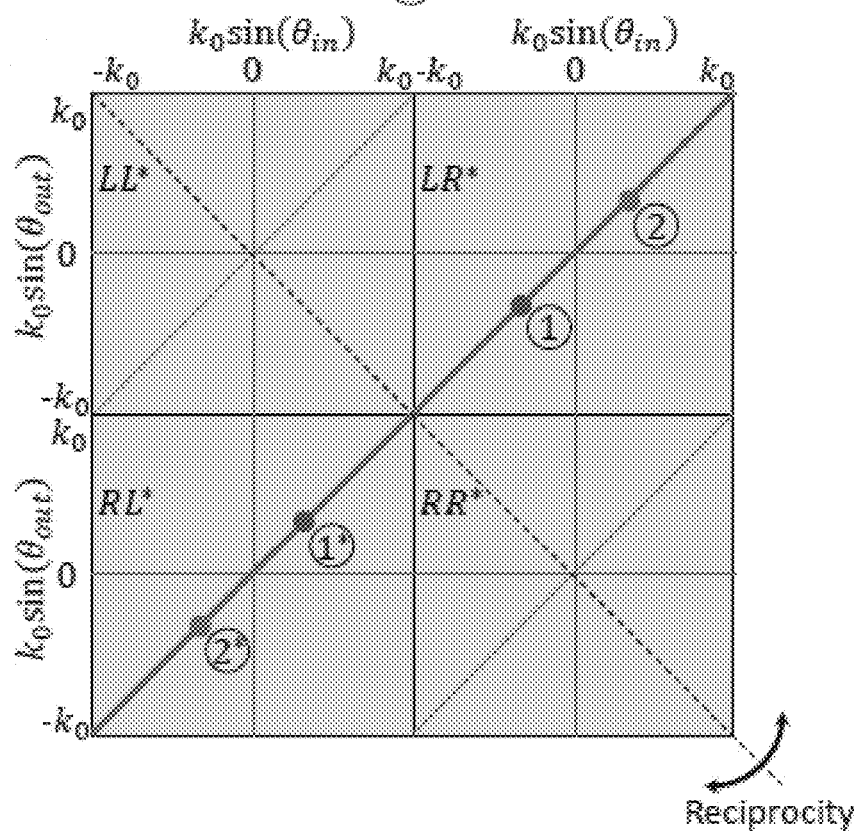
FIG. 10E depicts the nonlocal q-BIC as a purple dot placeable anywhere along the specular response (solid orange line) via a nonlocal phase gradient. Reciprocity (symmetry about the black dashed line) forbids the existence of unidirectional emission.
Figure 10F:
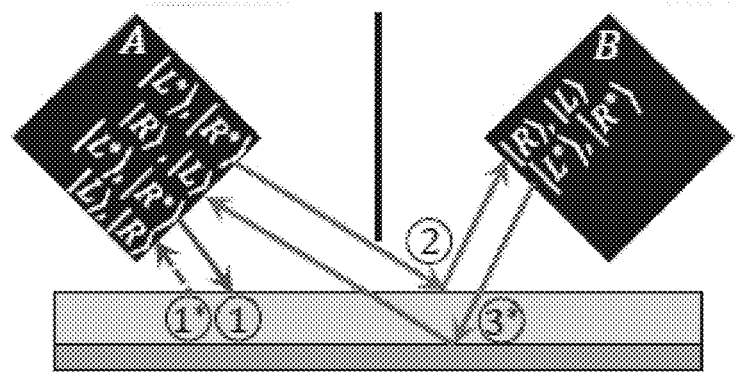
FIG. 10F and FIG. 10G shows the case of a local phase gradient but no nonlocal phase gradient, enabling unidirectional emission but not spin selectivity.
Figure 10G:
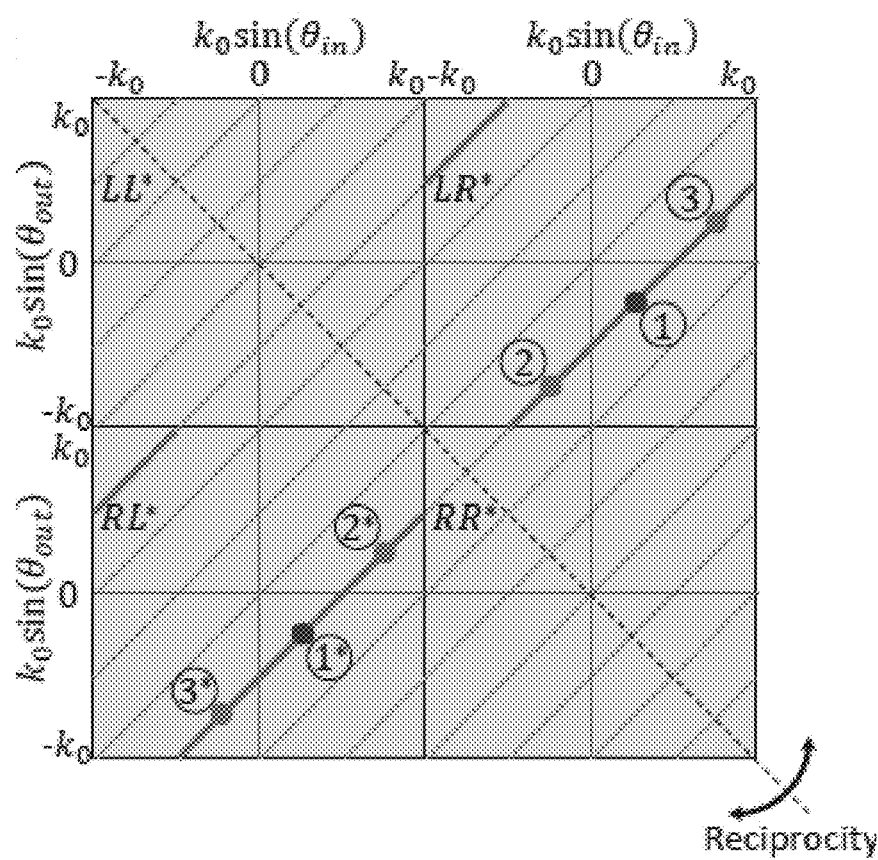

The following illustrates how these concepts, as well as the reciprocity constraint in Eq. (39), apply to the goal of unidirectional emission with a single specified spin. FIGS. 10A to 10K sketches the energy exchange between two black bodies at the same temperature, mediated by four distinct metasurface mirrors that support q-BICs at the operating wavelength and angles of incidence enabling exchange of energy between A and B. FIG. 10A provides the definitions and conventions used for the schematic depictions of idealized scattering matrices (the example of a perfect mirror is given in FIG. 10B), and FIG. 10C summarizes the behavior of the four metasurfaces studied in FIG. 10D, FIG. 10E, FIG. 10F, FIG. 10G, FIG. 10H, FIG. 10I, FIG. 10J and FIG. 10K. The scattering matrices apply to electric fields in a circular polarization basis across a continuous range of momenta:

$$E(k) = \begin{bmatrix} E_L(k) \\ E_R(k) \end{bmatrix}. \tag{45}$$

The first metasurface (FIG. 10D, FIG. 10E) is a device that supports an absorptive q-BIC born of interference with a local response that has no phase gradient or birefringence, equivalent to a specular mirror. In the absence of a q-BIC, its scattering matrix is given by Eq. (40), and is shown in FIG. 10B. This schematic represents the sparse matrix of scattering magnitudes due to the device, where the gray background refers to scattering events forbidden by conservation of linear momentum, and hence of magnitude o, and orange lines refer to scattering events satisfying conservation of linear momentum ($k_{out}=k_{in}+mk_G$ where $k_{out}$ is the horizontal output momentum, $k_{in}$ the horizontal input momentum, $k_G=2\pi/P$ is the quasi-momentum associated with a period P, and m is the diffraction order). The solid orange lines refer to scattering efficiencies of unity (here, $k_{out}=k_{in}$ such that the reflected spin is inverted), while the dashed orange lines refer to scattering efficiencies of zero ($k_{out}=k_{in}$ such that the reflected spin is preserved). Reciprocity (Eq. (39)) requires that these schematics have a mirror symmetry across the black dashed line.

The first metasurface differs from a specular mirror by the addition of a q-BIC with a nonlocal phase gradient. This is represented by a purple dot, whose magnitude may represent any number between o (perfect absorption) and 1 (perfect reflection). A nonlocal phase gradient may be used to shift the band-edge mode in k-space, and therefore the angle at which the thermal metasurface emits. Per Eqs. (37) and (38), such a nonlocal phase gradient is not independent of the local response. In particular, since the absorption due to a q-BIC is born of interference with the local (background) matrix, in the schematic in FIG. 10E it may only be placed along the orange dashed line. In the absence of the nonlocal phase gradient it would be located at $(k_{out}, k_{in})=(0, 0)$, but here the q-BIC has been shifted to $(k_{out}, k_{in})=(k_{nl}, k_{nl})$, where $k_{nl}$ is the momentum added by the nonlocal phase gradient.

Despite this shift in k-space, it is readily apparent that reciprocity forbids unidirectional emission. For instance, for a device aiming to absorb RCP light with $k_{nl}<0$ (marked by an encircled 1 in FIG. 10E), a reciprocal event (marked by an encircled 1*) exists corresponding to absorption of LCP with $k_{nl}>0$. In the schematic, the absorption is understood by finding the angle at which the q-BIC exists along the $\theta_m$ direction, and the polarization state being absorbed is understood by the second letter labeling the quadrant (the one labeled with the *, denoting a state traveling in the downwards direction). For instance, located in the LR* quadrant in FIG. 10E, the encircled 1 corresponds to absorption of $|R*\rangle$ at an angle $\theta_m<0$, while the reciprocal event corresponds to absorption of $|L*\rangle$ at an angle $\theta_m>0$. Upon time-reversal, these absorption events correspond to emission events satisfying time-reversal symmetry $$E(k)=E^*(-k). \tag{46}$$

In the schematic, the emission may be understood by looking at the location along the $\theta_{out}$ axis and the first letter marking the quadrant (without the label *, corresponding to upwards travelling states). For instance, the encircled 1 under time-reversal denotes the emission of $|L\rangle$ to an angle $\theta_{out}<0$, while the encircled 1* under time-reversal denotes the emission of $|R\rangle$ to an angle $\theta_{out}>0$. That is, as depicted in FIG. 10D, the emission and absorption events (purple) are completely described by the process 1 and its reciprocal copy, 1*. Due to the existence of this distinct reciprocal copy, this device cannot unidirectionally emit light even if it treats LCP and RCP differently.

The second metasurface (FIG. 10F, FIG. 10G) has a local phase gradient but no birefringence, and a q-BIC is applied with a nonlocal phase gradient. In this case, many diffraction orders m are supported, but the idealized case of FIG. 10G supports only a single diffraction order with unity reflectance. Without birefringence, the usual spin inversion occurs upon reflection, but due to the local phase gradient, the outgoing angle satisfies $k_{out}=k_{in}-k_G$. As before, a q-BIC may be placed along this diffraction order. In this case, it exists at the position $(k_{out}, k_{in})=(k_G/2, k_G/2)$, corresponding to local retroreflection. It is apparent that the process 1 and its reciprocal copy, 1* represent emission of light to the same outgoing angle $\theta_{out}$ but to polarization states of $|L\rangle$ and $|R\rangle$, respectively. The introduction of a local phase gradient does interestingly enable unidirectionality, but without birefringence, which cannot be achieved in a spin-selective manner (the result here is thermal emission with given linear polarization). Note that using a different nonlocal phase gradient would move the q-BIC off the retroflection condition and destroy the unidirectionality.

The third metasurface (FIG. 10H) adds birefringence to the case in FIG. 10D, providing a nonlocal phase gradient but no local phase gradient, as described by the local scattering matrix in Eq. (43). In this case, the local response preserves the spin upon reflection, moving the solid orange line to the appropriate quadrants compared to a specular mirror. Here, using a chiral q-BIC it is possible to achieve spin-selectivity. That is, the process 1 and its reciprocal copy 1* both represent emission of light to the state $|L\rangle$, which are therefore independent of the RCP response due to the birefringence. However, as in the previous cases, the presence of the reciprocal copy means that unidirectionality is forbidden: light is emitted to a state $|L\rangle$ to two equal and opposite angles. Notably, however, if the nonlocal phase gradient is removed (or set to 0), the processes 1 and 1* merge. In other words, process 1 is then its own reciprocal copy because it exists at the intersection of orange solid line and the black dashed line. Consequently, spin-selective unidirectional emission may be achieved in such a system, but only to normal incidence.

Figure 10H:
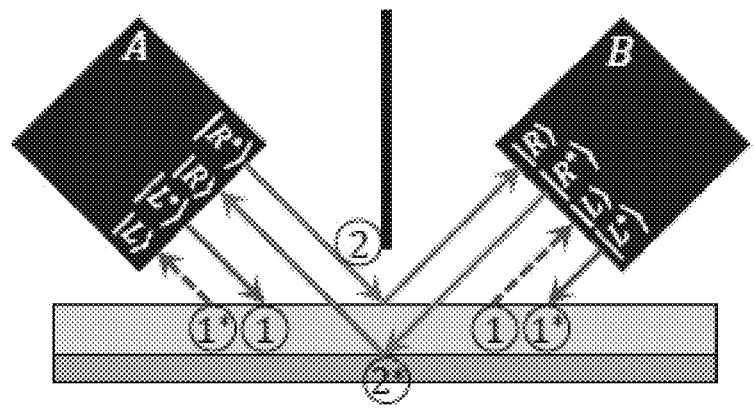
FIG. 10H and FIG. 10I shows birefringence being added, for the case of a birefringence local response with only a nonlocal phase gradient. Reciprocity forbids unidirectionality except at normal incidence in this case.
Figure 10I:
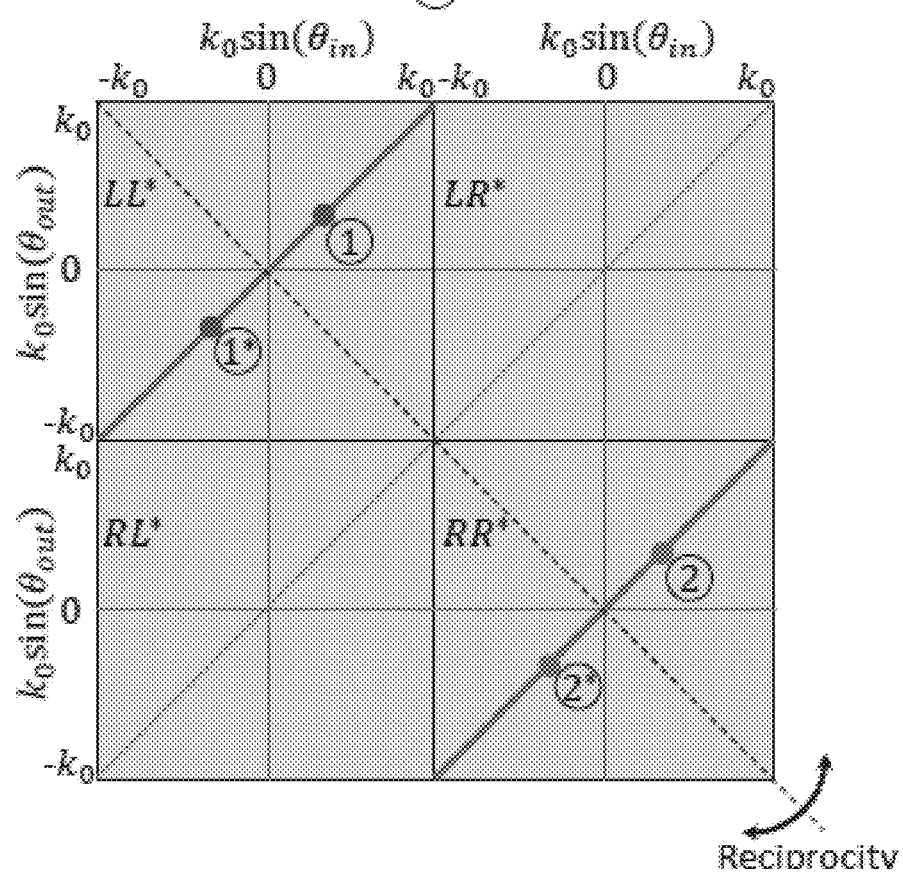
Figure 10J:
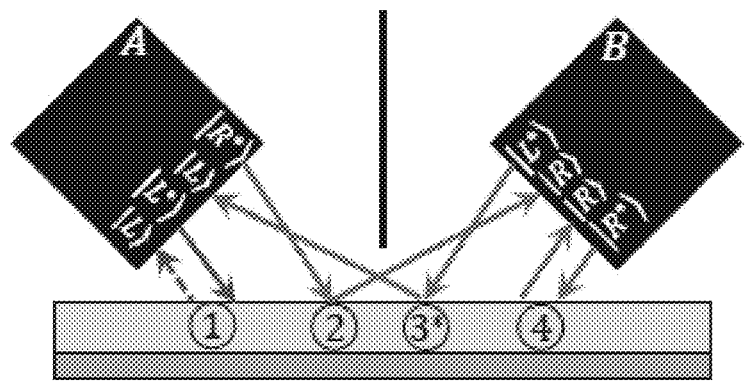
FIG. 10J and FIG. 10K shows the case with a local phase gradient, nonlocal phase gradient and birefringence, enabling spin-selective unidirectional thermal emission.
Figure 10K:
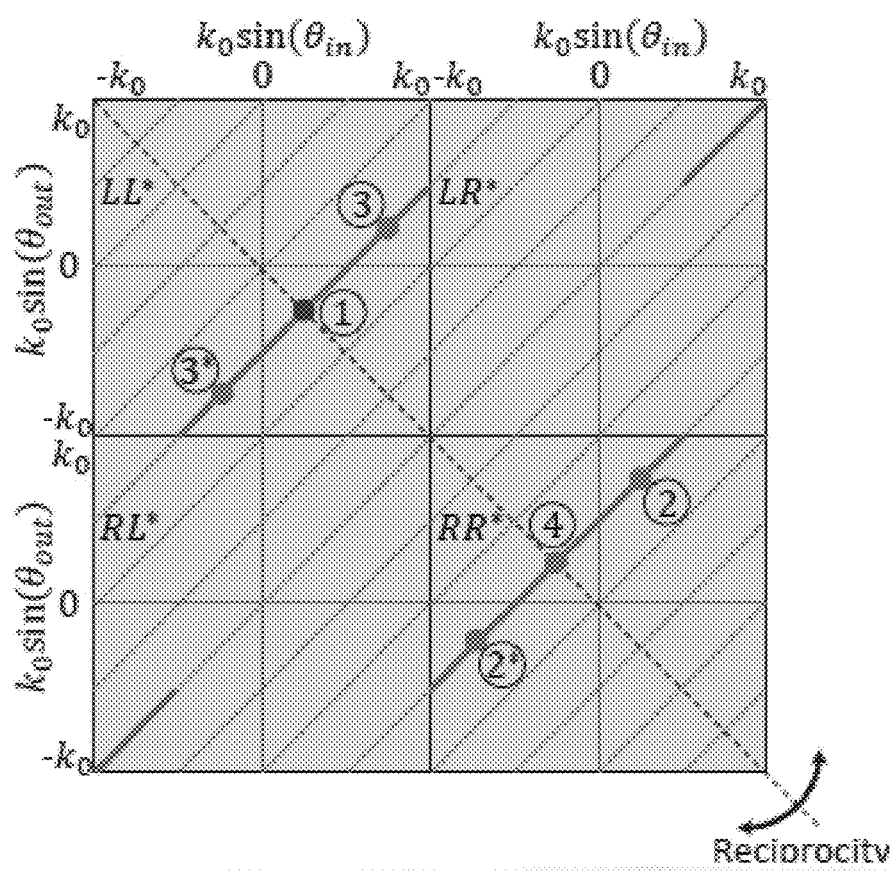

To generalize this achievement to any emission angle, a fourth metasurface (FIG. 10J and FIG. 10K) includes a local phase gradient metasurface along with birefringence (e.g., a Pancharatnam-Berry or geometric phase metasurface), and then places the q-BIC at the retroreflection condition using a nonlocal phase gradient. This configuration inherits the unidirectionality to an arbitrary angle stemming from the local phase gradient, as seen in the second device (FIG. 10F and FIG. 10G), as well as the spin-selectivity afforded by the birefringence, as seen in the third device (FIG. 10H and FIG. 10I). As depicted in FIG. 10J, this behavior is consistent with the second law of thermodynamics concerning exchange of energy between bodies A and B: since RCP light coming from B is retroreflected back to B (marked by an encircled 4), and LCP light coming from A is completely absorbed (marked by an encircled 1), these two channels do not exchange energy between A and B and therefore are independent. Meanwhile, the remaining processes (encircled 2 and 3) represent reciprocal channels of energy exchange between A and B.

To summarize the fundamental results of this section: time-reversal symmetry generally requires that a thermal metasurface can achieve spin-selective unidirectional emission to an arbitrary angle of choice only through a suitable combination of a birefringent local phase gradient and a nonlocal phase gradient. The birefringence makes the LCP and RCP channels independent in the far field, enabling a chiral structure to absorb a single spin without violating reciprocity. This enables spin-selective unidirectional emission at normal incidence in the absence of local and nonlocal phase gradients because the absorption process is its own reciprocal (retroreflection). Extending this property to any off-normal emission angle requires a local phase gradient to shift the retroreflection angle to the desired angle, and a nonlocal phase gradient to place the q-BIC precisely at the retroreflection condition.

Last, to further clarify this general result, it is compared to the behavior of the metasurface in FIGS. 8A-8F. The band diagram of the device is fundamentally constrained by reciprocity to be symmetric about normal incidence, with eigenfrequencies coming in pairs $\omega_i(k)=\omega_i(-k)$. Notably, this is true in any reciprocal system, including both FIGS. 8A-8F and all the devices in FIGS. 10A-10K. However, quite interestingly this property translates onto a symmetric emission pattern in FIG. 8D but not in FIG. 10J. While the underlying band structure of any reciprocal system satisfies $\omega_i(k)=\omega_i(-k)$, the far-field coupling of these modes must simply satisfy Eq. (39), written in the basis of Eq. (45) as $$S_{ij}(k_1,k_2)=S_{ji}(-k_2,-k_1). \quad (47)$$

Here, the indices refer to the polarization state, the first argument is the incoming wavenumber, and the second argument is the outgoing wavenumber. As argued schematically above on the basis of FIGS. 10A-10K, it is apparent from Eq. (47) that any modal absorption (say, at an angle $k_{in}=k_1$ and polarization i) necessarily comes with a reciprocal partner at ($k_{in}=-k_2$ and polarization j). Unidirectional absorption is therefore only possible when a single absorption event occurs such that $k_1=-k_2$ and i=j, which is the retroreflection condition in the appropriate polarization basis (FIGS. 10A-10K specifically refers to circular polarization). Note that when there are several modes contributing to absorption, the total absorption need not be the same at $k_1$ and $k_2$—although the current discussion has been focusing on a single mode.

Since q-BICs are born of interference with the background scattering of the surface, in periodic structures they may only emerge at $k_2=k_1+mk_G$, where $k_G$ is the phase gradient of the device and m is the diffraction order. Considering that for unidirectional absorption $k_1=-k_2$, conservation of momentum thereby requires that $2k_2=mk_G$. When m=0 (e.g., specular reflection), therefore, unidirectionality may occur only at normal incidence, where $k_1=-k_2=0$, consistent with the device in FIGS. 8A-8F. Yet for any other diffraction order, unidirectional thermal emission can occur at the arbitrary angle provided that the supported q-BIC emerges at the retroflection condition $k_2=-k_1=mk_G/2$. Hence, quite interestingly, a critically coupled q-BIC unidirectionally generally emits with outgoing momentum half of the one contributed by the local phase gradient.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A thermal metasurface comprising
    a dielectric slab with refractive index $n_1$,
    a first plurality of pillars with asymmetric shapes arrayed with a pitch distance P wherein each $i^{th}$ pillar in the first plurality of pillars is oriented at an angle $\theta_i$ relative to a longitudinal axis of the dielectric slab;
    a second plurality of pillars with asymmetric shapes displaced a distance d from the first plurality of pillars, wherein each $j^{th}$ pillar in the second plurality of pillars is oriented at an angle $\alpha_j$ relative to the longitudinal axis of the dielectric slab, wherein the angle $\theta_i$ is different than the angle $\alpha_j$;
    a third plurality of pillars with asymmetric shapes displaced by the pitch distance P from the second plurality of pillars, wherein each $j^{th}$ pillar in the third plurality of pillars is oriented at an angle $\alpha_j+90°$ relative to the longitudinal axis of the dielectric slab; and
    wherein the first, second and third plurality of pillars are disposed above the dielectric slab.

2. The thermal metasurface as recited in claim 1, wherein the first plurality of pillars with asymmetric shapes are elliptical columns with a length ($L_m$), a width ($W_m$) and a height ($H_m$).

3. The thermal metasurface as recited in claim 2, wherein the length ($L_m$) is between 50 nanometers and 5 microns, the width ($W_m$) is between 50 nanometers and 5 microns and the height ($H_m$) is between 50 nanometers and 15 microns.

4. The thermal metasurface as recited in claim 3, wherein the second plurality of pillars with asymmetric shapes and the third plurality of pillars with asymmetric shapes are elliptical columns with a length ($L_d$), a width ($W_d$) and a height ($H_d$).

5. The thermal metasurface as recited in claim 4, wherein the length ($L_d$) is between 50 nanometers and 5 microns, the width ($W_d$) is between 50 nanometers and 5 microns, and the height ($H_d$) is between 50 nanometers and 15 microns.

6. The thermal metasurface as recited in claim 5, wherein the height ($H_m$) is equal to the height ($H_d$).

7. The thermal metasurface as recited in claim 1, wherein the second and third plurality of pillars are coplanar with the first plurality of pillars.

8. The thermal metasurface as recited in claim 1, wherein the first plurality of pillars is disposed in a first plane, the second and third plurality of pillars are coplanar with each other and are disposed in a second plane, wherein the second plane is below the first plane.

9. The thermal metasurface as recited in claim 1, wherein the refractive index $n_1$ of the dielectric slab is produced using a dopant that provides an extinction coefficient κ, the refractive index $n_1$ producing a local amount of loss, wherein the $L_d$, the $W_d$ and the $H_d$ are selected to offset the local amount of loss.

10. The thermal metasurface as recited in claim 1, wherein the dielectric slab has a thickness between 50 nanometers and 15 microns.

11. The thermal metasurface as recited in claim 1, wherein the first plurality of pillars comprises a first pillar that is flanked by a second pillar of the second plurality of pillars and a third pillar of the third plurality of pillars.

12. The thermal metasurface as recited in claim 1, wherein the pitch distance P is between 50 nanometers and 5 microns.

13. A thermal metasurface comprising
a dielectric slab with refractive index $n_1$,
a dielectric film with refractive index $n_2$ that is different than $n_1$, wherein the dielectric film has optical losses $k_1$ supporting thermal emission or photoluminescent emission, the dielectric film being disposed above, and contiguous with, the dielectric slab;
a first plurality of pillars with asymmetric shapes arrayed with constant pitch distance P wherein each $i^{th}$ pillar in the first plurality of pillars is oriented at an angle $\theta_i$ relative to a longitudinal axis of the dielectric slab;
a second plurality of pillars with asymmetric shapes displaced a distance d from the first plurality of pillars, wherein each $j^{th}$ pillar in the second plurality of pillars is oriented at an angle $\alpha_j$ relative to the longitudinal axis of the dielectric slab, wherein the angle $\theta_i$ is different than the angle $\alpha_j$;
a third plurality of pillars with asymmetric shapes displaced by the pitch distance P from the second plurality of pillars, wherein each $j^{th}$ pillar in the third plurality of pillars is oriented at an angle $\alpha_j+90°$ relative to the longitudinal axis of the dielectric slab; and
wherein the first, second and third plurality of pillars are disposed above the dielectric slab.

14. The thermal metasurface as recited in claim 13, wherein the second and third plurality of pillars are coplanar with the first plurality of pillars.

15. The thermal metasurface as recited in claim 13, wherein the first plurality of pillars is disposed in a first plane, the second and third plurality of pillars are coplanar with each other and are disposed in a second plane, wherein the second plane is below the first plane.

16. The thermal metasurface as recited in claim 15, wherein the second and third plurality of pillars are disposed within the dielectric slab.

17. The thermal metasurface as recited in claim 13, wherein the dielectric film has a thickness between 50 nanometers and 15 microns.

\* \* \* \* \*